(12) United States Patent
Ito et al.

(10) Patent No.: US 7,702,227 B2
(45) Date of Patent: Apr. 20, 2010

(54) OPTICAL DEVICE HAVING BLUR CORRECTION FUNCTION

(75) Inventors: Sawako Ito, Utsunomiya (JP); Yuichiro Kato, Utsunomiya (JP); Takehiko Sato, Utsunomiya (JP); Shigeru Ogino, Laguna Niguel, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 11/464,780

(22) Filed: Aug. 15, 2006

(65) Prior Publication Data
US 2007/0041721 A1 Feb. 22, 2007

Related U.S. Application Data

(60) Provisional application No. 60/708,495, filed on Aug. 16, 2005, provisional application No. 60/728,225, filed on Oct. 19, 2005, provisional application No. 60/708,497, filed on Aug. 16, 2005, provisional application No. 60/728,256, filed on Oct. 19, 2005, provisional application No. 60/708,496, filed on Aug. 16, 2005, provisional application No. 60/728,408, filed on Oct. 19, 2005.

(51) Int. Cl.
*G03B 17/00* (2006.01)
*H04N 5/228* (2006.01)
*G02B 27/64* (2006.01)

(52) U.S. Cl. ............... 396/55; 348/208.1; 348/208.2; 348/208.7; 348/208.11; 359/557

(58) Field of Classification Search ............ 396/52–55; 348/208.99, 208.1, 208.2, 208.3, 208.4, 208.5, 348/208.6, 208.7, 208.11, 208.13; 359/555, 359/557

See application file for complete search history.

(56) References Cited

U.S. PATENT DOCUMENTS

| 5,954,634 | A | * | 9/1999 | Igarashi | ................. 600/109 |
| 6,809,462 | B2 | | 10/2004 | Pelrine et al. | |
| 6,891,317 | B2 | | 5/2005 | Pei et al. | |
| 7,423,824 | B2 | * | 9/2008 | Yamashita et al. | .......... 359/824 |
| 2002/0163581 | A1 | * | 11/2002 | Kitazawa et al. | ......... 348/208.6 |
| 2005/0140793 | A1 | * | 6/2005 | Kojima et al. | .......... 348/208.99 |

FOREIGN PATENT DOCUMENTS

JP 3501216 10/2001

OTHER PUBLICATIONS

Yoseph Bar-Cohen, Electroactive Polymer (EAP) Actuators as Artificial Muscles, book, 2004, pp. 22-31, pp. 535-539, The Society of Photo-Optical Instrumentation Engineers, United States of America.
John D. W. Madden, Artificial Muscle Technology: Physical Principles and Naval Prospects, IEEE Journal of Oceanic Engineering, Jul. 2004, vol. 29 No. 3, pp. 207-728, IEEE, United States of America.
Steven Ashley, Artifical Muscles, Scientific American, Oct. 2003, Scientific American, Inc., United States of America.

* cited by examiner

*Primary Examiner*—Rochelle-Ann J Blackman
(74) *Attorney, Agent, or Firm*—Canon USA Inc IP Division

(57) ABSTRACT

An optical device includes a lens holding member that holds a lens and that is movable in a direction along a plane that is orthogonal to an optical axis of the lens, and an actuator that moves the lens holding member in the direction along the plane. In the optical device, the actuator includes an actuator element, formed of electroactive polymer, and a connecting member that connects the lens holding member to the actuator element.

2 Claims, 27 Drawing Sheets

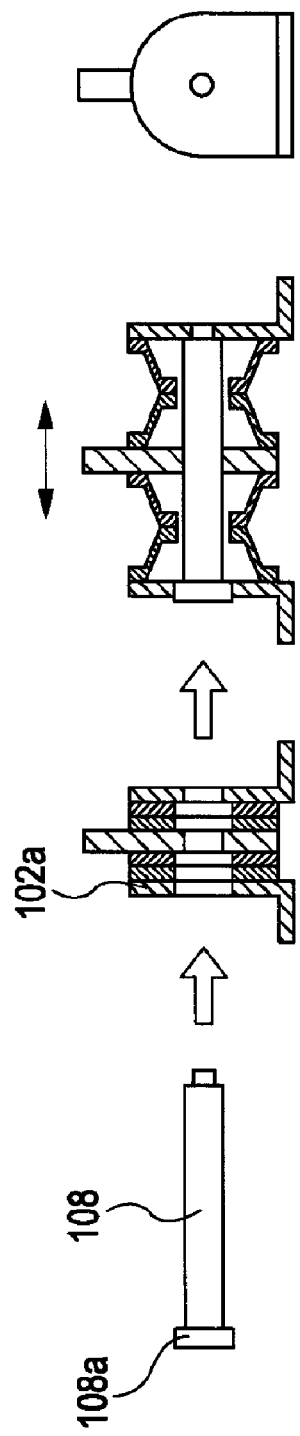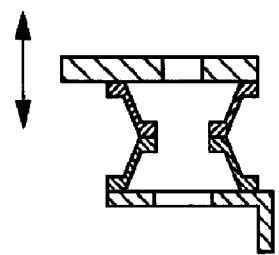
FIG. 15
FIG. 16

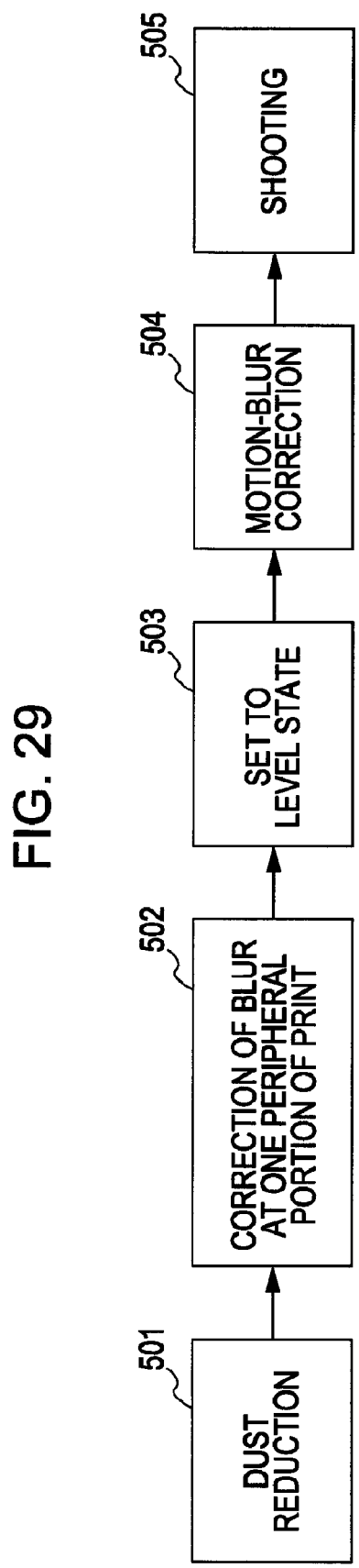

OPTICAL DEVICE HAVING BLUR CORRECTION FUNCTION

CROSS-REFERENCE TO RELATED APPLICATION

This application claims the benefit of U.S. Provisional Application No. 60/708,495, filed Aug. 16, 2005, U.S. Provisional Application No. 60/728,225, filed Oct. 19, 2005, U.S. Provisional Application No. 60/708,497, filed Aug. 16, 2005, U.S. Provisional Application No. 60/728,256, filed Oct. 19, 2005, U.S. Provisional Application No. 60/708,496, filed Aug. 16, 2005, and U.S. Provisional Application No. 60/728,408, filed Oct. 19, 2005, which are hereby incorporated by reference in their entirety.

BACKGROUND OF THE INVENTION

1. Field of the Invention

The present invention relates to an optical device using an electroactive polymer actuator as an actuator of a blur correcting unit.

2. Description of the Related Art

In recent years, widespread use of subminiature cameras mounted in digital or cellular telephones has resulted in an increasing demand for optical devices, such as cameras and video cameras, that are small and that provide high performance. When cameras or video cameras are reduced in size, the influence of vibration that they receive due to, for example, motion blurring is increased, thereby resulting in frequent blurring of a picked up image. Therefore, demand for a blur correcting mechanism is increasing. Hitherto, an electromagnetic motor has generally been used as an actuator for a driving mechanism of a blur correcting unit. The electromagnetic motor comprises a coil and a magnet, and converts electrical energy into driving power on the basis of what is called "Fleming's Law," as a result of supplying electric current through the coil in the magnetic field of the magnet. A position detector, such as a light-receiving element, is used as a sensor that detects a driving displacement of the electromagnetic motor. To reduce the size of the actuator used as the electromagnetic motor, it is necessary to increase driving power that is generated per volume of the actuator. However, when the driving power is increased, the magnetic field needs to be increased. More specifically, a large driving power can be generated by any one of the following methods:

(1) Passing a large current as a result of increasing the diameter of the coil;

(2) Increasing the number of windings of the coil; or (3) Increasing the magnetic flux density as a result of increasing the size of the magnet.

However, when these methods are used, the electromagnetic motor is increased in size, thereby increasing the amount of electric current consumed and requiring a sophisticated controlling system. Therefore, there is a limit as to how small the electromagnetic motor can be made when these methods are used.

In addition, driving noise of the motor, itself, and noise of, for example, a gear (which is a mechanism for transmitting the driving power of the electromagnetic motor) are generated. Further, the mechanism has a sliding portion, thereby reducing the durability of the mechanism.

In recent years, research is being conducted on high polymeric materials, which have high generative force per volume and high strain, themselves, to apply the high polymeric materials to, for example, artificial muscles. An actuator (electroactive polymer actuator) to which high polymeric material is applied is available.

The electroactive polymer actuator is compressed in the direction of an electric field by electrostatic force that is generated between electrodes by applying voltage between the electrodes. At the same time, it is stretched perpendicularly to the electric field to produce pressure, so that it is possible to increase the strain of the polymeric material, itself, and the output per volume. Therefore, the pressure and strain can be provided by direct driving, thereby making it unnecessary to use a mechanism, such as a displacement enlarging mechanism or a speed reduction mechanism, such as a gear box, required in, for example, related motors. Consequently, it is possible to reduce the size, costs, and noise, and to achieve proper durability. In addition, as disclosed in, for example, U.S. Pat. No. 6,809,462, if a change in electrostatic capacitance caused by a displacement of the electroactive polymer actuator is detected by a sensor circuit, the electroactive polymer actuator can be used as a sensor. A circuit for detecting a change in electrostatic capacitance, such as a resonator-type circuit, is widely known, so that a related circuit may be used for the circuit for detecting a change in electrostatic capacitance.

Japanese Patent No. 3501216 gives examples in which an electrostrictive stretching-and-contracting material is used in, for example, a valve device, a pump device, an actuator device, a sensor device, a generating device, and a vibratory driving device.

U.S. Pat. No. 6,891,317 discloses a cylindrical electroactive polymer actuator which is stretched and contracted in an axial direction thereof.

SUMMARY OF THE INVENTION

According to an aspect of the present invention, an optical device comprises a lens holding member that holds a lens and that is movable in a direction along a plane that is orthogonal to an optical axis of the lens, and an actuator that moves the lens holding member in the direction along the plane. The actuator includes an actuator element, formed of electroactive polymer, and a connecting member that connects the lens holding member to the actuator element.

According to another aspect of the present invention, an optical device comprises an image pickup element that receives light from a shooting optical system, an image-pickup-element holding member that holds the image pickup element and that is movable in a direction along a plane that is orthogonal to an optical axis of the shooting optical system, and an actuator that moves the image-pickup-element holding member in the direction along the plane. The actuator includes an actuator element, formed of electroactive polymer, and a connecting member that connects the image-pickup-element holding member to the actuator element.

According to another aspect of the present invention, an optical device comprises an image pickup element that receives light from a shooting optical system, an image-pickup-element holding member that holds the image pickup element and that is movable in an optical axis direction of the shooting optical system, and an actuator that moves the image-pickup-element holding member in the optical axis direction. The actuator includes an actuator element, formed of electroactive polymer, and a connecting member that connects the image-pickup-element holding member to the actuator element.

According to another aspect of the present invention, an optical device comprises an image pickup element that receives light from a shooting optical system, an imagepickup-element holding member that holds the image pickup element and that is movable in a direction of an optical axis of the shooting optical system, a first actuator that moves the image-pickup-element holding member in the direction of the optical axis, a base member that supports the image-pickup-element holding member and the first actuator and that is movable in a direction along a plane that is orthogonal to the optical axis of the shooting optical system, and a second actuator that moves the base member in the direction along the plane. The first actuator and the second actuator each include an actuator element, formed of electroactive polymer, and a connecting member that connects the image-pickup-element holding member to the actuator element.

Further features of the present invention will become apparent from the following description of exemplary embodiments with reference to the attached drawings.

BRIEF DESCRIPTION OF THE DRAWINGS

FIGS. 13 to 15 illustrate a structure of another electroactive polymer actuator unit according to the present invention.

FIG. 16 illustrates a structure of still another electroactive polymer actuator unit according to the present invention.

FIG. 29 is a flowchart of the steps of operating a shooting device according to the twelfth embodiment.

DESCRIPTION OF THE EMBODIMENTS

First Embodiment

Figure 1:
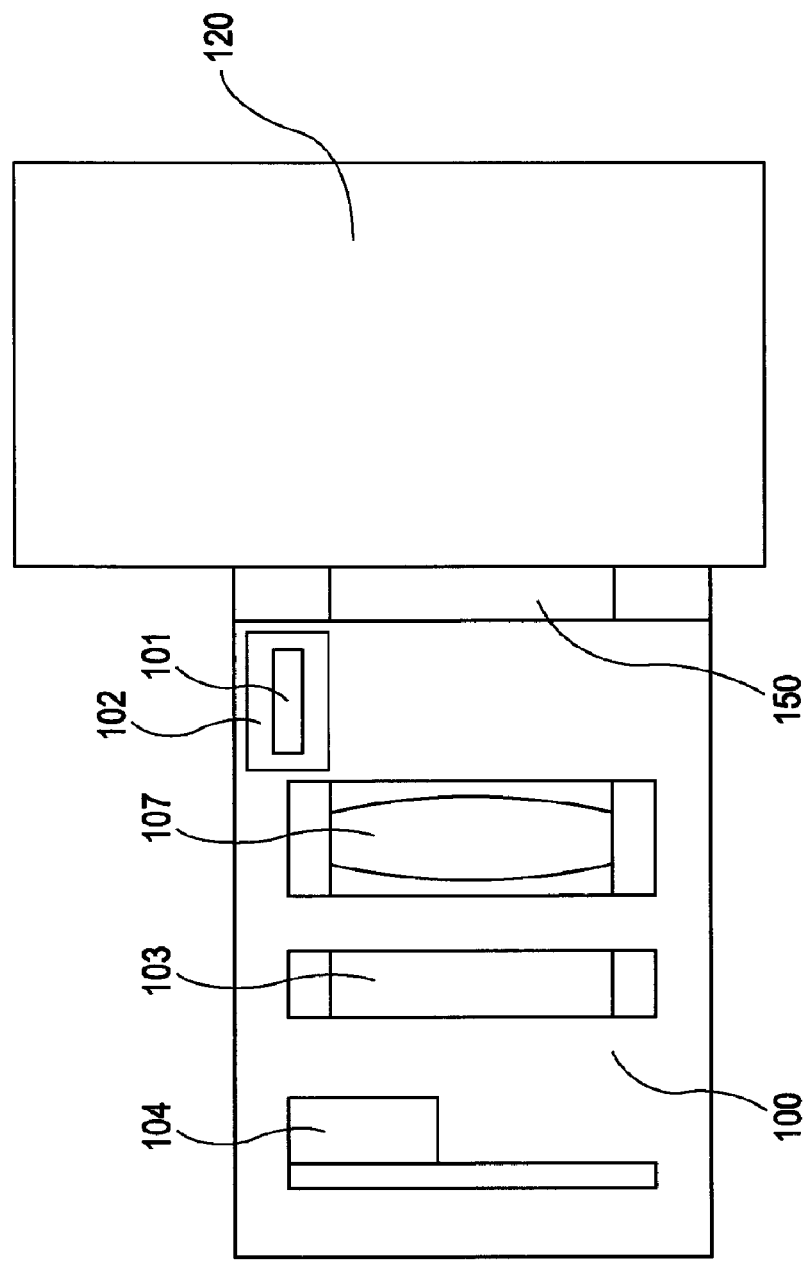
FIG. 1 shows a main portion of an optical device including a camera and an interchangeable lens.

FIG. 1 shows a main portion of an optical device (camera system) including a camera and an interchangeable lens according to an embodiment of the present invention. An interchangeable lens 100 is connected to a camera body 120 by a communication contact 150 of a mount. A main substrate 102 that controls driving of an actuator, a focus lens driving unit 103, a stop driving unit 104, and a motion-blur-prevention driving unit 107 that corrects motion blurring are mounted in the interchangeable lens 100. The interchangeable lens 100 is controlled by a controlling circuit 101 on the main substrate 102. The actuator and the main substrate 102 are electrically connected to each other by a flexible printed circuit board (not shown).

First Embodiment

Figure 2:
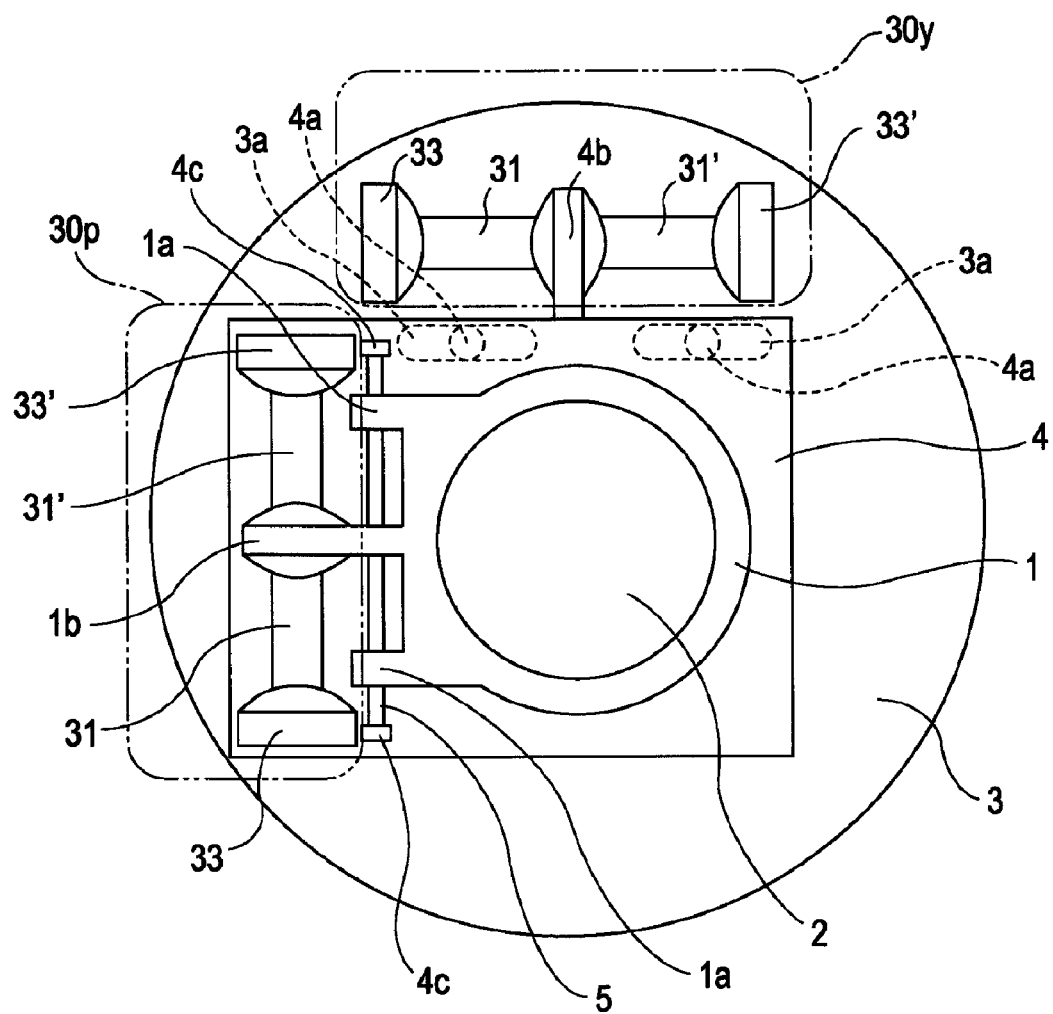
FIG. 2 shows a structure of a blur correcting unit in an interchangeable lens according to a first embodiment.
Figure 3A:
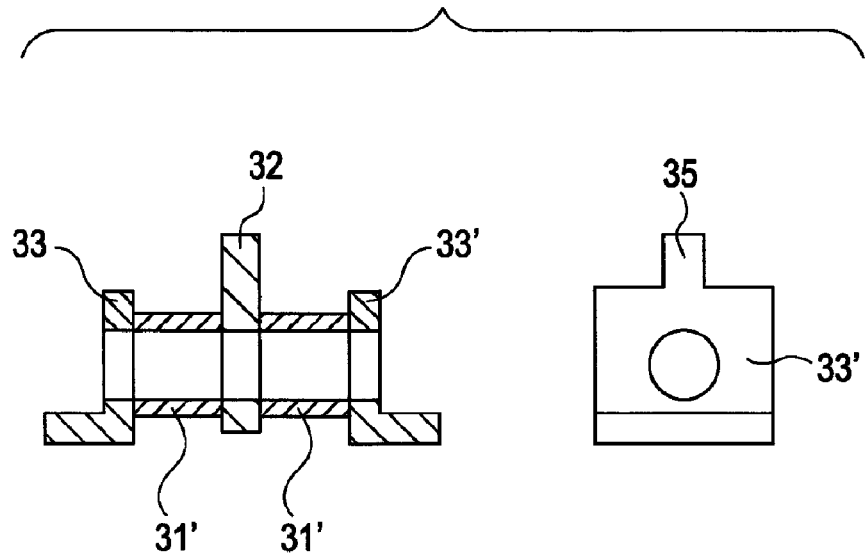
FIGS. 3A and 3B show structures of a two-phase electroactive polymer actuator.
Figure 3B:
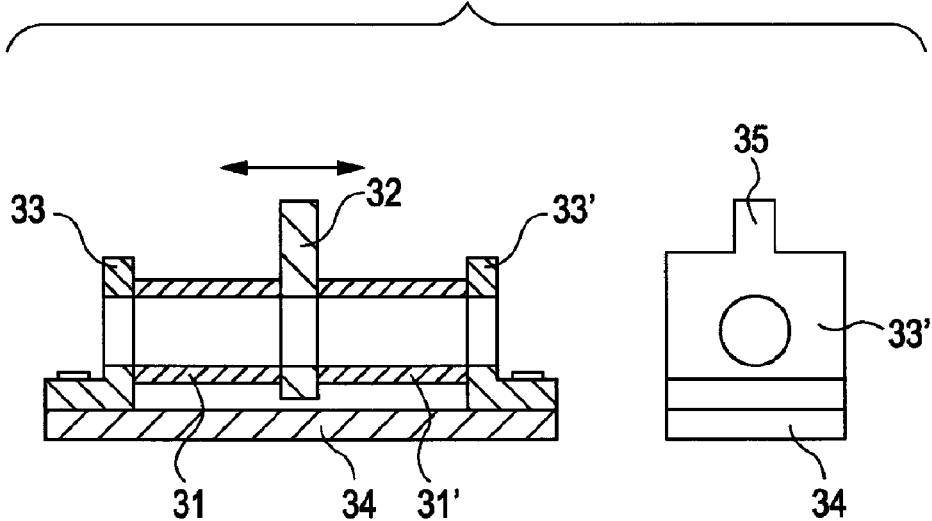
Figure 4:
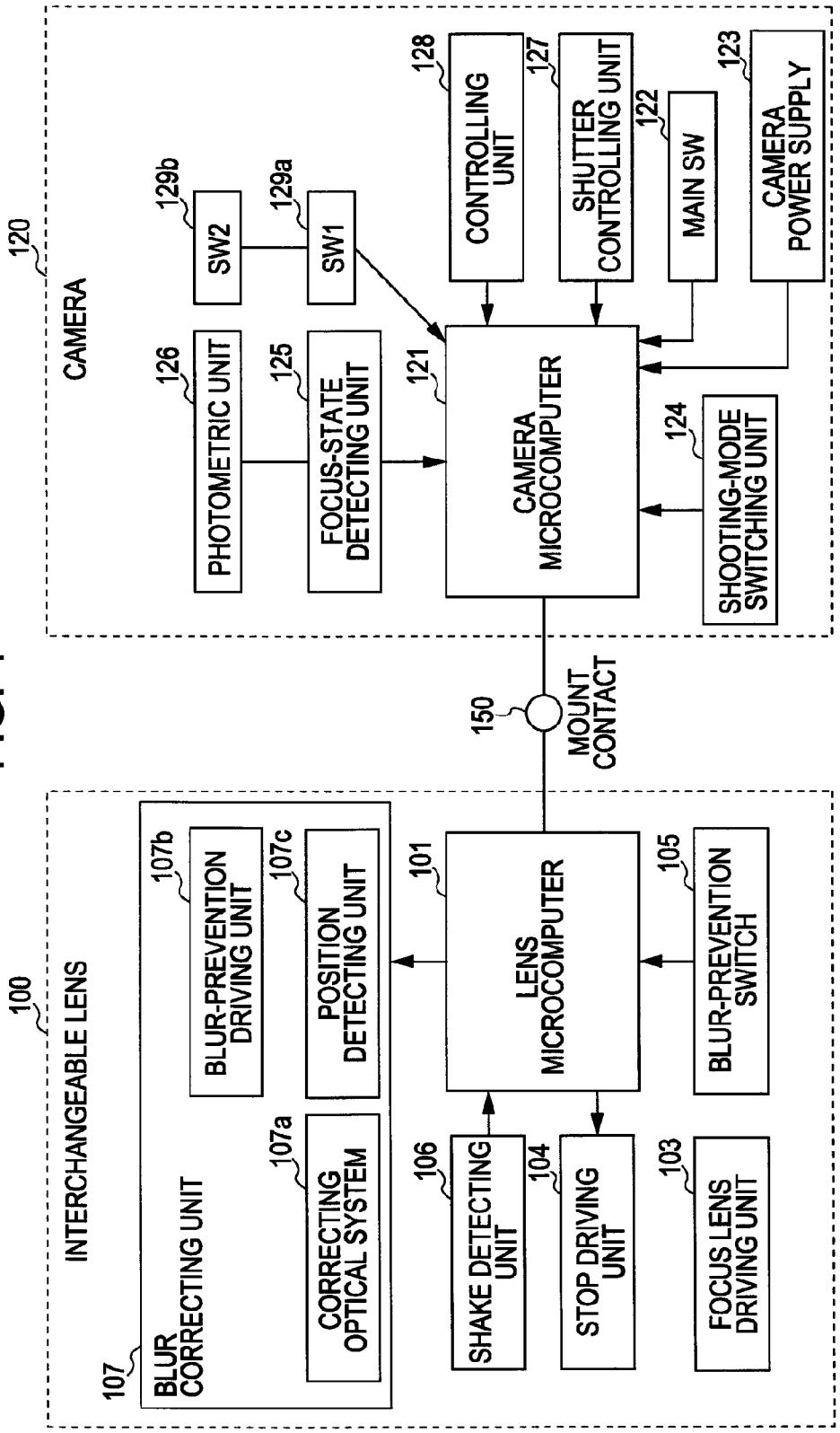
FIG. 4 is a block diagram of a structure of a camera and a structure of an interchangeable lens.
Figure 5:
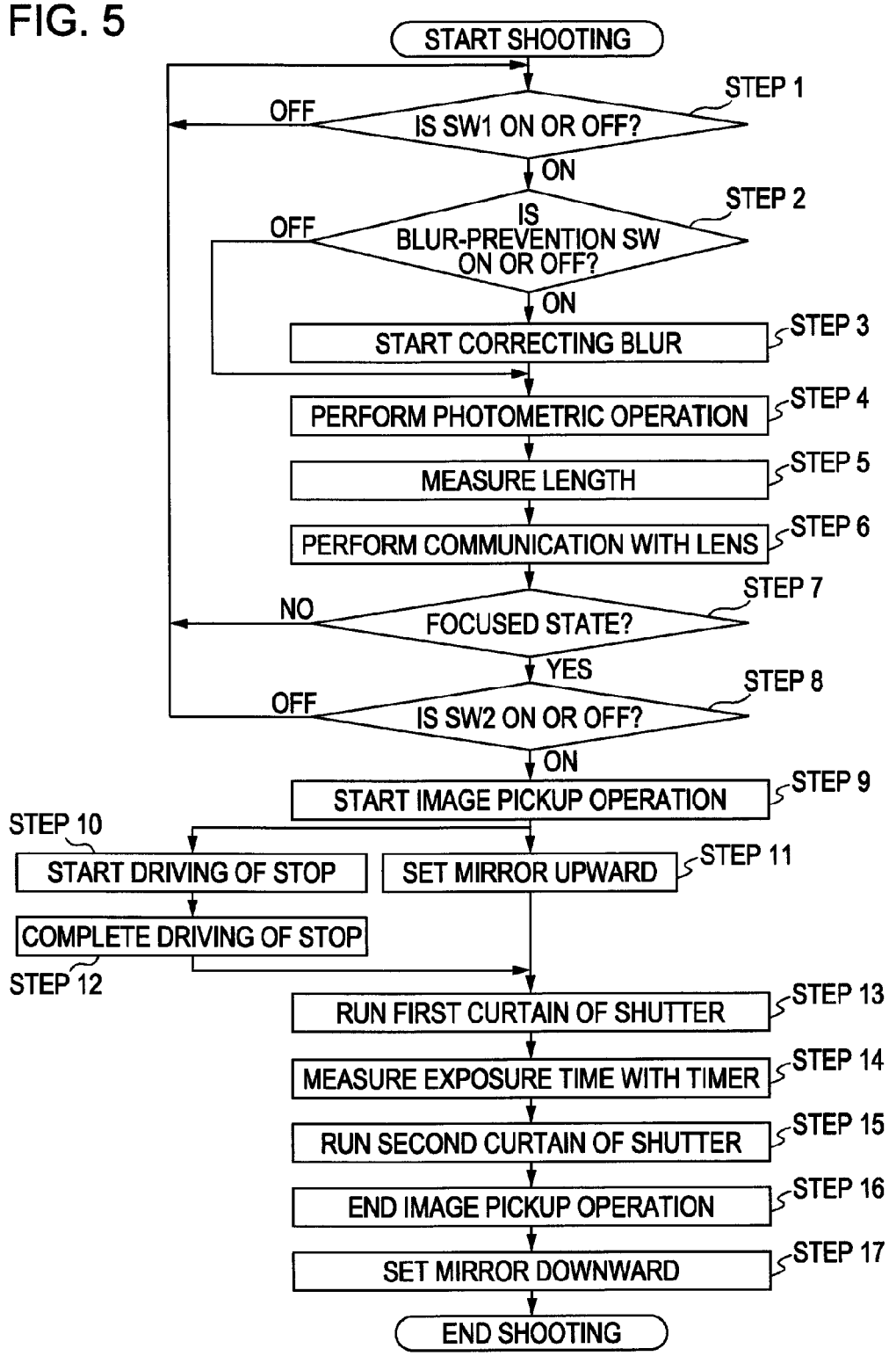
FIG. 5 is a flowchart of the steps of controlling a driving operation of the lens when the two-phase electroactive polymer actuator is used.

FIGS. 2 to 5 show a first embodiment of the present invention. FIG. 2 shows a structure of a blur correcting unit in an interchangeable lens according to the first embodiment. FIGS. 3A and 3B show structures of a two-phase electroactive polymer actuator element. FIG. 4 is a block diagram of a structure of a camera and a structure of the lens. FIG. 5 is a flowchart of the steps of controlling a driving operation of the lens when a two-phase electroactive polymer actuator unit is used.

In FIG. 2, reference numeral 1 denotes a lens holder that holds a correcting lens 2 at the center thereof, reference numeral 30$y$ denotes an electroactive polymer actuator unit that is disposed so as to be stretched and contracted in a yaw direction (that is, in a direction of a horizontal axis in FIG. 2), and reference numeral 30$p$ denotes an electroactive polymer actuator unit that is disposed so as to be stretched and contracted in a direction which is orthogonal to the actuator unit 30$y$, or a pitch direction (that is, in a direction of a vertical axis in FIG. 2). Driving the actuator units 30$y$ and 30$p$ causes a supporting member 4$b$ (which is connected to and which supports a yaw holder 4) and a supporting member 1$b$ (which is connected to and supports the lens holder 1) to be displaced, thereby allowing light that is incident upon the correcting lens 2 to be deflected through the lens holder 1. Therefore, when camera shaking in the yaw direction and the pitch direction is detected by a sensor, such as a vibratory gyroscope, and the correcting lens 2 is displaced so that the light is deflected in a direction opposite to the camera shaking, the camera shaking can be corrected.

Here, the structure of the two-phase electroactive polymer actuator units 30$y$ and 30$p$ will be described with reference to FIGS. 2, 3A, and 3B.

Reference numerals 31 and 31' denote cylindrical actuator elements formed of electroactive polymer. Although, in U.S. Pat. No. 6,891,317, the use of acrylic material or silicon dielectric elastomer is disclosed, the embodiment is not particularly limited thereto. Holding members 32, 33, and 33' are mechanical members for holding the actuator elements 31 and 31', and are secured to both ends of the actuator elements 31 and 31' with an adhesive. In each actuator unit, the holding member 32 has a key 35 for being mechanically linked to the lens holder. In the embodiment, the key 35 is used to take out driving power of the actuator. A flat plate 34 shown in FIG. 3B provides a pre-strain to the actuator elements 31 and 31', and has an overall length that is longer than the length of the actuator shown in FIG. 3A by a particular amount.

As mentioned above, it is widely known that properties, such as electrostatic breaking strength, of each actuator can be improved by applying a certain amount of pre-strain to the actuator elements 31 and 31' formed of electroactive polymer. In the embodiment, an axial pre-strain is applied to the actuator elements shown in FIG. 3A by using the flat plate 34. In the actuator unit shown in FIG. 3A, while stretching the actuator elements (films) 31 and 31' within an elastic deformation range in an axial direction by using a mounting jig (not shown), the holding member 33 and holding member 33' are secured to the flat plate 34 with screws. Making the actuator unit usable by the use of the flat plate 34 is effective in facilitating controlling of the properties of the actuator unit.

In the embodiment, the flat plate 34 need not be used. When the flat plate 34 is not used, the actuator unit shown in FIG. 3A is directly mounted in a lens barrel while stretching the actuator unit in the axial direction thereof. More specifically, the holding members 33 and 33' shown in FIG. 3A are directly mounted to a bottom board 3 and the yaw holder 4 shown in FIG. 2. Obviously, the actuator unit and the flat plate 34 may be unitized as shown in FIG. 3B, and mounted to the blur correcting unit shown in FIG. 2.

Rough calculation results of the size of each actuator unit in the structure according to the embodiment are given below.

When the thickness of an electroactive polymer film is 50 μm and driving voltage is 5 KV, the width and length of the film that can move a 10-gram load through a distance of 1 mm are approximately 10 mm and 2 mm, respectively. When the film is wound into the form of a cylinder and the inside diameter is 2 mm, the outside diameter is approximately 3 mm. Therefore, from these results, the length of one actuator unit is equal to the sum of the lengths of two films (2 mm×2) and the total thickness of three holding members. That is, it is possible to realize a small actuator unit having a length of approximately 6 mm and an outside diameter of 3 mm.

Next, the setting of an initial position of each actuator unit according to the present invention will be described.

In each actuator unit according to the embodiment, when voltage is not applied to the actuator elements 31 and 31', an initial position of the key 35 can be maintained by the elastic force of the actuator elements 31 and 31'. In a related blur correcting unit, when a power supply is turned on, a resetting operation is performed to return a correcting lens to its predetermined position. In each actuator unit according to the embodiment having the above-described structure, however, the resetting operation can be omitted. In addition, at the initial position, electric power for positioning each actuator unit is not required, so that electric power can be saved. In the embodiment, an initial reset position is set so that the center of the correcting lens defines an optical axis. In other words, each actuator unit is secured so that, when voltage is not applied to each actuator unit, the central position of the correcting lens coincides with the optical axis of the lens barrel. The position where each actuator unit is secured is not limited to the optical-axis center and the center of the correcting lens, so that it may be any predetermined position that is suitable for the optical device.

In FIG. 2, the bottom board 3 disposed in the lens barrel of the camera serves as a base that supports the motion-blur correcting mechanism. The yaw holder 4 has protrusions 4a that are fitted to yaw-direction slotted holes 3a of the bottom board 3. The key 35 shown in FIGS. 3A and 3B is connected to the supporting member 1b shown in FIG. 2, so that the yaw holder 4 can only be displaced in the yaw direction.

In FIG. 2, reference numeral 5 denotes a guide bar that is inserted into guide holes 1a in the lens holder 1. Both ends of the guide bar 5 are supported at respective bearings 4c of the yaw holder 4 so that the axial direction of the guide bar 5 is the pitch direction. By virtue of this structure, the key 35 of the actuator unit shown in FIG. 3 is connected to the supporting member 1b shown in FIG. 2 and drives the lens holder 1 only in the pitch direction with respect to the yaw holder 4. Since the yaw holder 4 can be displaced only in the yaw direction with respect to the bottom board 3, the displacements of the lens holder 1 and the yaw holder 4 allow the correcting lens 2 to be displaced in both the pitch direction and the yaw direction. In the above-described structure, the directions of displacements of the lens holder 1 and the yaw holder 4 are not limited to those mentioned above, so that the directions of displacements of these parts may be transposed.

By virtue of the above-described structure, driving only the lens holder 1 in the pitch direction (that is, the direction in which gravitational force acts) prevents a large load from being exerted upon the actuator unit. When the correcting lens 2 is driven in the yaw direction, the correcting lens 2 and the actuator unit 30p are driven together, so that they are smoothly operated without any displacement between them.

FIG. 4 is a block diagram of a general structure of an optical device (camera system) including a camera and an interchangeable lens. In FIG. 4, corresponding parts to those shown in FIG. 1 are given the same reference numerals.

First, a structure of the interchangeable lens will be described.

A lens microcomputer 101 is mounted in an interchangeable lens 100. Communication is performed from a camera body to the lens 100 through a communication contact 150. On the basis of a command value of the communication, controlling of a blur correcting unit 107 and operations of a focus-lens driving unit 103 and a stop driving unit 104 is performed. A blur-prevention switch 105 is switched on or off depending upon whether or not blur correction is to be carried out. When a main switch 122 of the camera is turned on, and the blur-prevention switch 105 is turned on by a shooter, a signal detected by a shake sensor 106 that detects camera shaking is transmitted to the lens microcomputer 101. On the basis of the value of the signal, the lens microcomputer 101 calculates a blur correction value and issues the blur correction value to the blur correcting unit 107. This causes a blur-prevention driving unit 107b to drive a correcting optical system 107a to correct the blurring. The blur correcting unit 107 comprises the correcting optical system 107a, the blur-prevention driving unit 107b, and a position detecting unit 107c. The method used for detecting position with the position detecting unit 107c is that disclosed in, for example, U.S. Pat. No. 6,809,462, in which a change in the distance between electrodes caused by applying voltage to the actuator elements (polymers) 31 and 31' is detected as a change in electrostatic capacitance or resistance of the polymers, and the detected value is converted into the displacement of the actuator unit and the position of the lens. The position detecting unit 107c is integrally formed with the actuator unit. On the basis of a shake amount detected by the shake sensor 106, the lens microcomputer 100 calculates the blur correction amount and controls the blur-prevention driving unit 107b. The electroactive polymer, serving as the position detecting unit 107c, is used to calculate the displacement of the actuator unit and the position of the lens. The calculated value is fed back to the lens microcomputer and a control amount is calculated. This control amount is issued to the blur-prevention driving unit to perform the controlling operation. The position detecting unit may be an attached external sensor, such as a photodetector, or a built-in sensor, such as an electrostatic capacitive detector.

Integrally forming the actuator unit and the position detector as mentioned above makes it possible to reduce the size of the optical device. In addition, the number of parts is reduced, so that it is possible to reduce costs and increase workability.

The focus-lens driving unit 103 performs a focusing operation as a result of driving a focusing lens on the basis of a command value from the lens microcomputer 101. The stop driving unit 104 reduces the aperture of a stop to a position set by a command value from the lens microcomputer 101 or restores the stop to its full-aperture state.

The lens microcomputer 101 also transmits states of the interior of the lens (such as focus position and stop value) and information regarding the lens (such as data required for detection and calculation of a focus state, maximum aperture, and focal length) to the camera body 120 through the contact 150.

An electrical system in the interchangeable lens 100 comprises the lens microcomputer 101, the blur-prevention driving unit 107, the focus-lens driving unit 103, and the stop driving unit 104. A camera power supply 123 supplies electric power to the lens electrical system through the contact 150.

A focus-state detecting unit 125, a photometric unit 126, a shutter controlling unit 127, a controlling unit 128, and a camera microcomputer 121 (which, for example, controls the starting or stopping of the operations of these units, calculates exposure, and calculates a focus state) are mounted in the camera body 120. As with the interchangeable lens, electric power is supplied to an electrical system in the camera body 120 by the camera power supply 123 in the camera body 120.

A main switch 122 is a switch that starts the camera body. When the main switch 122 is turned on, electric power is supplied to the camera body and the lens by the power supply 123. Reference numeral 124 denotes a shooting-mode switching switch. When the switch 124 is switched on, a snapshot is taken. Reference numeral 129a (SW1) denotes a switch for performing a photometric operation or for detecting a focus state. Reference numeral 129b (SW2) denotes a release switch. In general, the switches 129a and 129b are two stroke switches. The switch 129a is switched on by a first stroke of the release button, and the switch 129b is turned on by a second stroke of the release button.

Here, communication between the camera body and the interchangeable lens will be described.

The communication is a clock-synchronization serial communication in which lines for three signals, a serial clock signal that is transmitted to the interchangeable lens from the camera body, a data signal that is transmitted to the interchangeable lens from the camera body, and a data signal that is transmitted from the interchangeable lens to the camera body, are used. Since a signal receiving unit and a signal transmitting unit are independently formed, in one communication, the transmission of data from the camera body to the interchangeable lens and the transmission of data from the interchangeable lens to the camera body are performed at the same time. The communication is performed by using a command with respect to the interchangeable lens, when data becomes necessary for detecting the focus state or for performing photometric calculation at the camera body, or each time a focusing operation or a stopping operation is required.

Next, the steps of operating the interchangeable lens and the camera body will be described with reference to the flowchart shown in FIG. 5.

[Step 1] The state of the switch 129a (SW1) is detected. If it is off, the process remains at Step 1, whereas, if it is on, the process proceeds to Step 2.

[Step 2] The ON/OFF state of the blur-prevention switch 105 is detected. If it is on, the process proceeds to Step 3, whereas, if it is off, the process proceeds to Step 4.

[Step 3] Since the blur-prevention switch 105 is on, a blur-prevention driving command is transmitted to the interchangeable lens, and the process proceeds to Step 4.

[Step 4] The light-shielding unit 126 is driven to perform a photometric operation, and the process proceeds to Step 5.

[Step 5] The focus-state detecting unit 125 is driven to detect a focus state, and the process proceeds to Step 6.

[Step 6] Communication with the interchangeable lens is performed. The communication is carried out for transmitting to the lens microcomputer 101 a focusing lens driving amount obtained from the result of detecting and calculating the focus state.

[Step 7] Whether or not the lens is focused is determined. If it is focused, the process proceeds to Step 8, whereas, if it is not focused, the process returns to Step 1.

[Step 8] The ON/OFF state of the release switch 129b (SW2) is detected. If it is on, the process proceeds to Step 9, whereas, if it is off, the process returns to Step 1.

[Step 9] Since the release switch 129b (SW2) is on, an image pickup start signal is transmitted to the interchangeable lens, and the process proceeds to Steps 10 and 11.

[Step 10] The stop driving unit 104 of the interchangeable lens is operated, and the process proceeds to Step 12.

[Step 11] A quick-return and mirror-upward-setting operation is performed at the camera body, and the process proceeds to Step 13.

[Step 12] The driving of the stop is completed, and the process proceeds to Step 13.

[Step 13] The shutter unit 127 is driven to cause a first curtain of a shutter to run for starting exposure, and the process proceeds to Step 14.

[Step 14] An exposure time that has been set in Step 4 on the basis of, for example, a photometric value is measured with a timer. When the measurement ends, the process proceeds to Step 15.

[Step 15] The shutter unit 127 is driven to cause a second curtain of the shutter to run for ending the exposure, and the process proceeds to Step 16.

[Step 16] An image pickup end signal is transmitted to the interchangeable lens, and the process proceeds to Step 17.

[Step 17] A quick-return and mirror-downward-setting operation is performed at the camera body, and the shooting ends.

Second Embodiment

Figure 10:
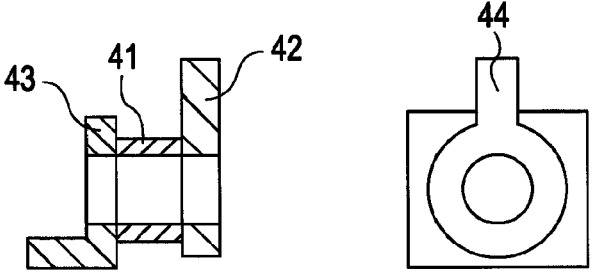
FIG. 10 shows a structure of a one-phase electroactive polymer actuator.
Figure 11:
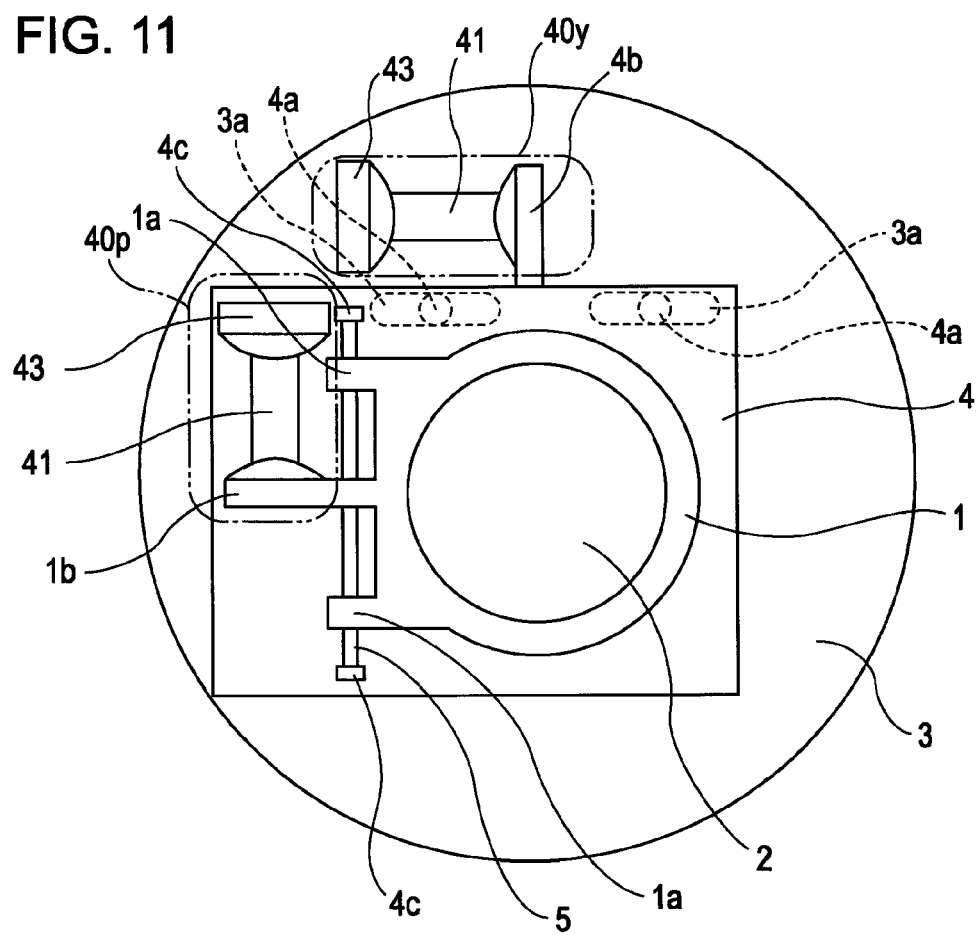
FIG. 11 shows a structure of a blur correcting unit in an interchangeable lens according to a second embodiment.
Figure 12:
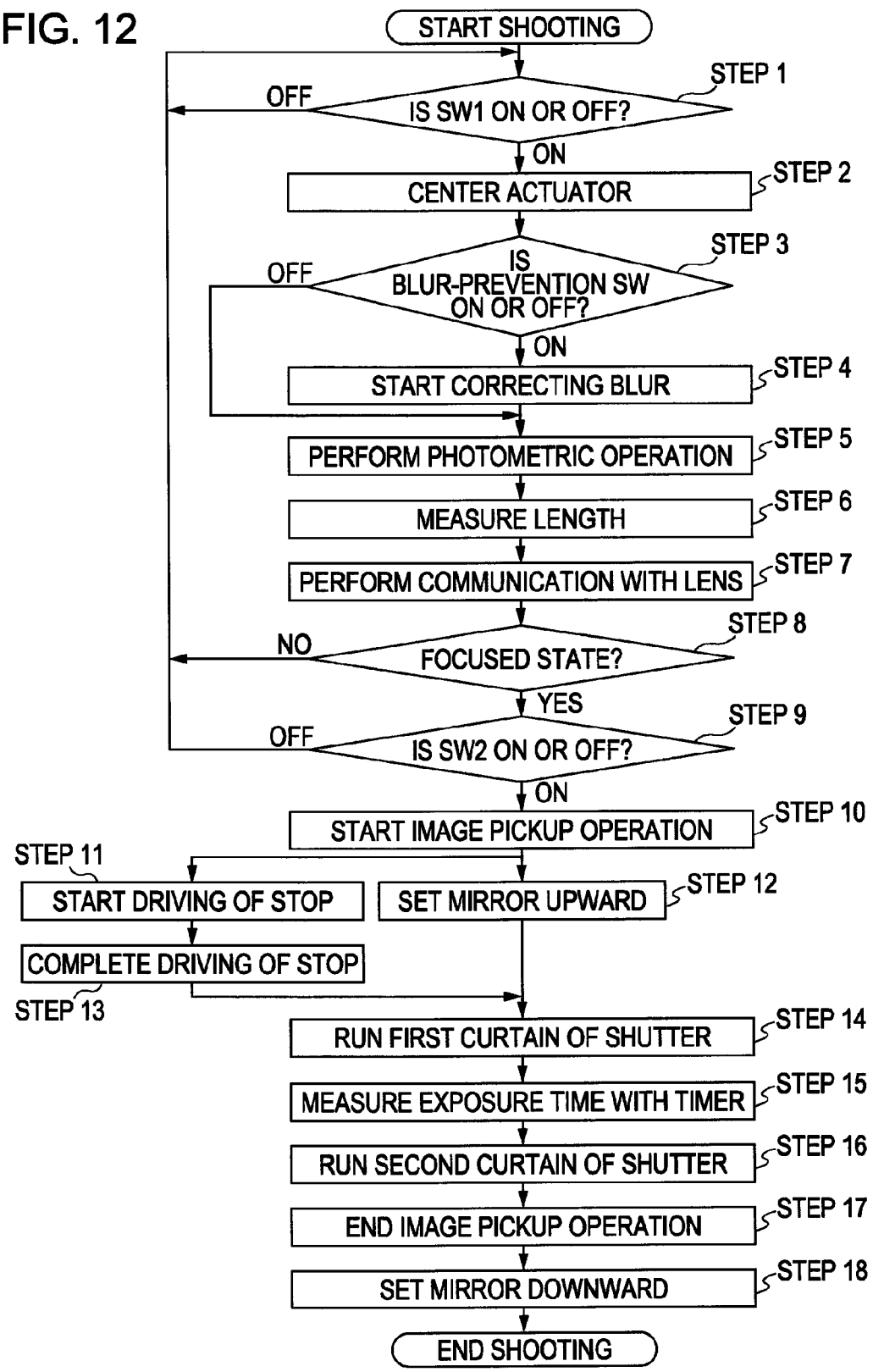
FIG. 12 is a flowchart of the steps of controlling a driving operation of the lens when the two-phase electroactive polymer actuator is used.

FIG. 4 and FIGS. 10 to 12 are diagrams related to a second embodiment of the present invention. FIG. 4 is a block diagram of the structure of the camera and the structure of the lens. FIG. 10 shows a structure of a one-phase electroactive polymer actuator. FIG. 11 shows a structure of a blur-correcting unit in an interchangeable lens. FIG. 12 is a flowchart of the steps of controlling a driving operation of the lens.

FIG. 11 shows a structure of a blur-prevention driving unit in an interchangeable lens according to the second embodiment.

In FIG. 11, reference numeral 1 denotes a lens holder that holds a correcting lens 2 at the center thereof, reference numeral 40y denotes a one-phase electroactive polymer actuator unit that is disposed so as to be stretched and contracted in a yaw direction (that is, in a direction of a horizontal axis in FIG. 11), and reference numeral 40*p* denotes a one-phase electroactive polymer actuator unit that is disposed so as to be stretched and contracted in a direction which is orthogonal to the yaw-direction actuator unit 40*y*, or a pitch direction (that is, in a direction of a vertical axis in FIG. 11). Driving the actuator units 40*y* and 40*p* causes a supporting member 4*b* (which is connected to and which supports a yaw holder 4) and a supporting member 1*b* (which is connected to and supports the lens holder 1) to be displaced, thereby allowing light that is incident upon the correcting lens 2 to be deflected through the lens holder 1. Therefore, when camera shaking in the yaw direction and the pitch direction is detected by a sensor, such as a vibratory gyroscope, and the correcting lens 2 is displaced so that the light is deflected in a direction opposite to the camera shaking, the camera shaking can be corrected.

Here, the structure of the one-phase electroactive polymer actuator units 40*y* and 40*p* will be described with reference to FIGS. 10 and 11.

Reference numerals 41 denote cylindrical actuator elements formed of electroactive polymer. Although, in U.S. Pat. No. 6,891,317, the use of acrylic material or silicon dielectric elastomer is disclosed, the embodiment is not particularly limited thereto.

Holding members 42 and 43 are mechanical members for holding the actuator elements (polymers) 41, and are secured to both ends of the actuator elements 41 with an adhesive. Each holding member 43 is a fixed end that is fixed to a base member, and each holding member 42 is a movable end. Each holding member 42 has a key 44 for being mechanically linked to the lens holder 1 and the yaw holder 4. In the embodiment, each key 44 is used to extract driving power of the actuator. For example, a helical compression spring (not shown) is provided between the holding members 42 and 43 to prevent buckling of the actuator element (polymer) 41. Although, in the embodiment, the holding members 43 shown in FIG. 10 are directly mounted to a bottom board 3 shown in FIG. 11, they may be indirectly mounted to the bottom board 3.

Next, the setting of an initial position of each actuator unit according to the present invention will be described.

When voltage is not applied to each one-phase electroactive polymer actuator unit, each actuator unit has a natural length, whereas, when voltage is applied, it is stretched. However, each actuator unit is not compressed from its natural length as long as a force is not applied to each actuator unit. Here, when each electroactive polymer actuator unit is used in a blur correcting unit, it is necessary to stretch or contract the actuator element (polymer) 41 to move the movable end 42 horizontally in the direction of the horizontal axis in FIG. 10. Therefore, it is necessary to stretch each electroactive polymer actuator unit by a certain amount as a result of previously applying a certain amount of voltage to each electroactive polymer actuator unit (pre-charging operation), to increase or decrease voltage from the predetermined voltage, and to make each actuator unit appear as if it is stretch or contracted with a pre-charged position as the center.

In a related blur correcting unit, when a power supply is turned on, a centering operation is performed to return a correcting lens to a particular position, which is, usually, a position where the center of the lens and the position of the optical axis coincide. In the structure of each actuator unit according to the embodiment, the position to which the actuator is pre-charged is made to coincide with the centering position, thereby making it possible to correct blurring at the most optically optimal position. The centering position is not limited to the optical axis center and the center of the correcting lens, so that it may be a predetermined position that is suitable for the optical device.

In FIG. 11, the bottom board 3 disposed in the lens barrel of the camera serves as a base that supports the motion-blur correcting mechanism. The yaw holder 4 has protrusions 4*a* that are fitted to yaw-direction slotted holes 3*a* of the bottom board 3. The key 44 shown in FIG. 10 is connected to the supporting member 3*b* shown in FIG. 11, so that the yaw holder 4 can only be displaced in the yaw direction.

In FIG. 11, reference numeral 5 denotes a guide bar that is inserted into guide holes 1*a* in the lens holder 1. Both ends of the guide bar 5 are supported at respective bearings 4*c* of the yaw holder 4 so that the axial direction of the guide bar 5 is the pitch direction. By virtue of this structure, the key 44 of the actuator unit shown in FIG. 10 is connected to the supporting member 1*b* shown in FIG. 11 and drives the lens holder 1 only in the pitch direction with respect to the yaw holder 4. Since the yaw holder 4 can be displaced only in the yaw direction with respect to the bottom board 3, the displacements of the lens holder 1 and the yaw holder 4 allow the correcting lens 2 to be displaced in both the pitch direction and the yaw direction. In the above-described structure, the directions of displacements of the lens holder 1 and the yaw holder 4 are not limited to those mentioned above, so that the directions of displacements of these parts may be transposed.

By virtue of the above-described structure, driving only the lens holder 1 in the pitch direction prevents a large load from being exerted upon the actuator unit. When the correcting lens 2 is driven in the yaw direction, the correcting lens 2 and the actuator unit 40*p* are driven together, so that they are smoothly operated without any displacement between them.

Next, the steps of operating the interchangeable lens and the camera body will be described with reference to the block diagram of FIG. 4 and the flowchart shown in FIG. 12.

[Step 1] The state of the switch 129*a* (SW1) is detected. If it is off, the process remains at Step 1, whereas, if it is on, the process proceeds to Step 2.

[Step 2] A blur-correction driving unit is centered, that is, a certain voltage is applied to each actuator element (electroactive polymer) 41 to drive the correcting lens to a position where the optical axis center and the center of the correcting lens coincide, and the process proceeds to Step 3.

[Step 3] The ON/OFF state of the blur-prevention switch 105 is detected. If it is on, the process proceeds to Step 4, whereas, if it is off, the process proceeds to Step 5.

[Step 4] Since the blur-prevention switch 105 is on, a blur-prevention driving command is transmitted to the interchangeable lens to start correcting the blurring.

[Step 5] The light-shielding unit 126 is driven to perform a photometric operation, and the process proceeds to Step 6.

[Step 6] The focus-state detecting unit 125 is driven to detect a focus state, and the process proceeds to Step 7.

[Step 7] Communication with the interchangeable lens is performed. The communication is carried out for transmitting to the lens microcomputer 101 a focusing lens driving amount obtained from the result of detecting and calculating the focus state.

[Step 8] Whether or not the lens is focused is determined. If it is focused, the process proceeds to Step 9, whereas, if it is not focused, the process returns to Step 1.

[Step 9] The ON/OFF state of the release switch 129*b* (SW2) is detected. If it is on, the process proceeds to Step 10, whereas, if it is off, the process returns to Step 1.

[Step 10] Since the release switch 129*b* (SW2) is on, an image pickup start signal is transmitted to the interchangeable lens, and the process proceeds to Steps 11 and 12.

[Step 11] The stop driving unit 104 of the interchangeable lens is operated, and the process proceeds to Step 13.

[Step 12] A quick-return and mirror-upward-setting operation is performed at the camera body, and the process proceeds to Step 14.

[Step 13] The driving of the stop is completed, and the process proceeds to Step 14.

[Step 14] The shutter unit 127 is driven to cause a first curtain of a shutter to run for starting exposure, and the process proceeds to Step 15.

[Step 15] An exposure time that has been set in Step 5 on the basis of, for example, a photometric value is measured with a timer. When the measurement ends, the process proceeds to Step 16.

[Step 16] The shutter unit 127 is driven to cause a second curtain of the shutter to run for ending the exposure, and the process proceeds to Step 17.

[Step 17] An image pickup end signal is transmitted to the interchangeable lens, and the process proceeds to Step 18.

[Step 18] A quick-return and mirror-downward-setting operation is performed at the camera body, and the shooting ends.

Third Embodiment

Next, a third embodiment of the present invention will be described with reference to FIG. 6.

Figure 6:
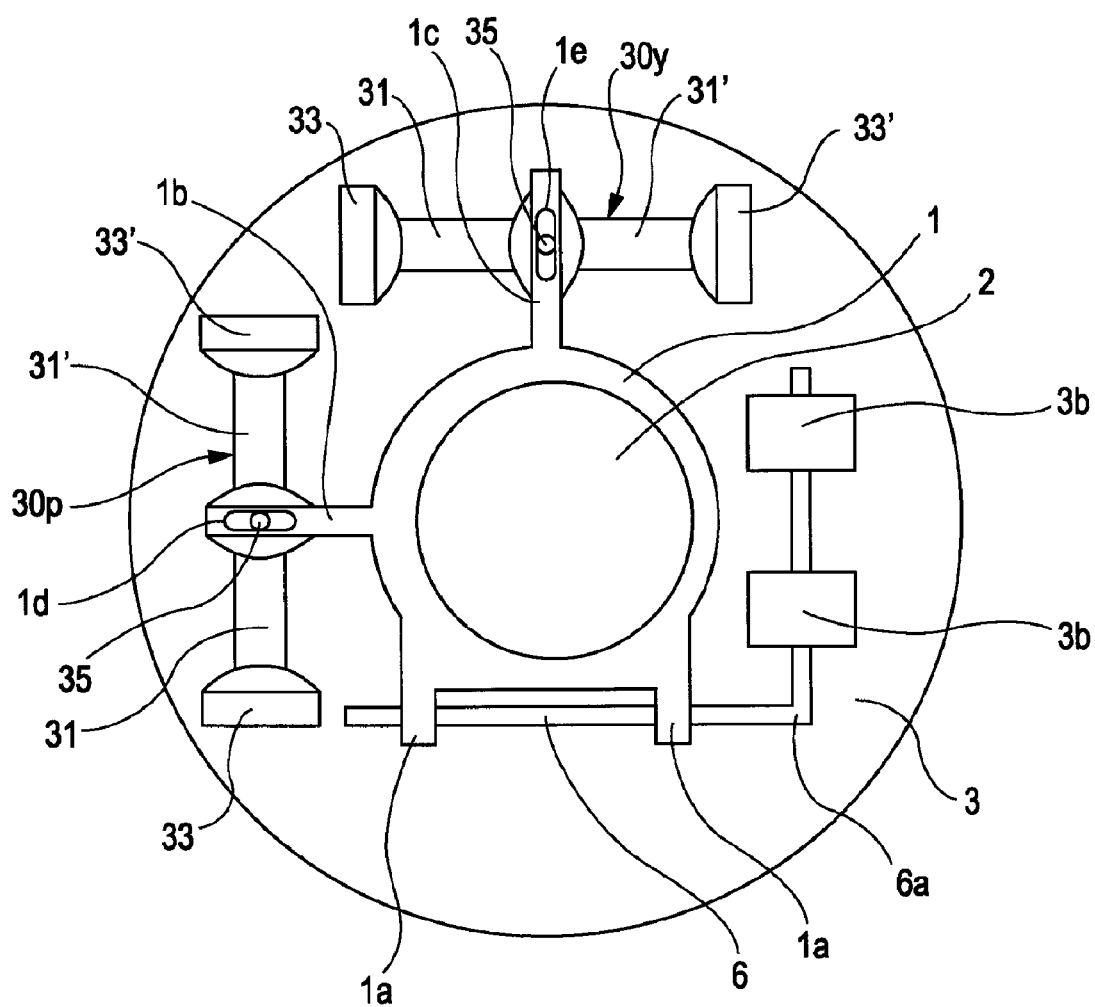
FIG. 6 shows a structure of a blur correcting unit in an interchangeable lens according to a third embodiment.

FIG. 6 shows a structure of a blur correcting unit in an interchangeable lens. The third embodiment differs from the first and second embodiments in the structure of the blur correcting unit.

In FIG. 6, reference numeral 1 denotes a lens holder that holds a correcting lens 2. By displacing the correcting lens 2 through the lens holder 1 in a plane that is perpendicular to an optical axis, it is possible to deflect incident light. Therefore, when camera shaking in a yaw direction (that is, in a direction of a horizontal axis in FIG. 6) and a pitch direction (that is, in a direction of a vertical axis in FIG. 6) is detected by a sensor, such as a vibratory gyroscope, and the correcting lens 2 is displaced so that the light is deflected in a direction opposite to the camera shaking, the camera shaking can be corrected.

Reference numeral 3 denotes a bottom board disposed in a lens barrel of the camera and serving as a base that supports a lens shift mechanism. Supporting members 1b and 1c that support the lens holder 1 are disposed at the lens holder 1. The supporting member 1b has a yaw-direction slotted hole 1d, and the supporting member 1c has a pitch-direction slotted hole 1e. Reference numeral 30y denotes an electroactive polymer actuator unit that is disposed so as to be stretched and contracted in the yaw direction, and reference numeral 30p denotes an electroactive polymer actuator unit that is disposed so as to be stretched and contracted in a direction that is orthogonal to the actuator unit 30y, that is, in the pitch direction. The actuator units 30p and 30y each include actuator elements (polymers) 31 and 31', holding members 33 and 33', and a key 35.

A slotted hole 1d and a horizontal axis of an L-shaped supporting shaft 6 that is inserted in guide holes 1a formed in the lens holder 1 are provided so as to displace the lens holder 1 only in the yaw direction. A slotted hole 1e and a vertical axis of the L-shaped supporting shaft 6 that is inserted in guide holes 3b are provided so as to drive the lens holder 1 only in the pitch direction.

Since the actuator keys 35 are fitted to their respective slotted holes 1d and 1e and the L-shaped supporting shaft 6 is inserted in the guide holes 1a and 3b, when the actuator units 30p and 30y are driven while being stretched or contracted, the lens holder 1 is displaced in two directions, the pitch direction and the yaw direction, with respect to the bottom board 3, that is, in the plane that is perpendicular to the optical axis thereof.

In the above-described structure, the L-shaped supporting shaft 6 has a bent portion 6a. Therefore, when the rigidity of the bent portion 6a is low, the lens holder 1 may also rotate around the optical axis when the lens holder 1 is driven. Consequently, in the optical device according to the present invention, the L-shaped supporting shaft 6 is designed considering the following to prevent the lens holder 1 from rotating around the optical axis. A natural frequency that depends upon the spring rigidity of the bent portion 6a of the L-shaped supporting shaft 6 and the total mass of the lens holder 1 (including the mass of the correcting lens 2) is set at at least 300 Hz. This is because, since a blur-correction driving area based on the lens holder 1 is 100 Hz (although motion blurring of, for example, a camera occurs in the range of from 1 Hz to 10 Hz, the range needs to be widened to 100 Hz to precisely correct motion blurring), the lens holder 1 rolls around the optical axis even within the blur-correction driving area unless the natural frequency is set in the frequency range that is equal to or greater than 100 Hz.

Although, in the above-described structure, two-phase electroactive polymer actuators are used, one-phase electroactive polymer actuators may also be used as in the second embodiment.

In the optical device according to the present invention, the spring constant of the bent portion 6a of the L-shaped supporting shaft 6 is reverse-calculated from the natural frequency determined on the basis of the aforementioned reason, to determine the material and the size of the L-shaped supporting shaft 6. By virtue of the above-described structure that uses the L-shaped supporting shaft 6, it is possible to reduce the number of parts used in the blur correcting unit, thereby reducing costs and increasing workability.

Fourth Embodiment

A fourth embodiment of the present invention will be described with reference to FIG. 7.

Figure 7:
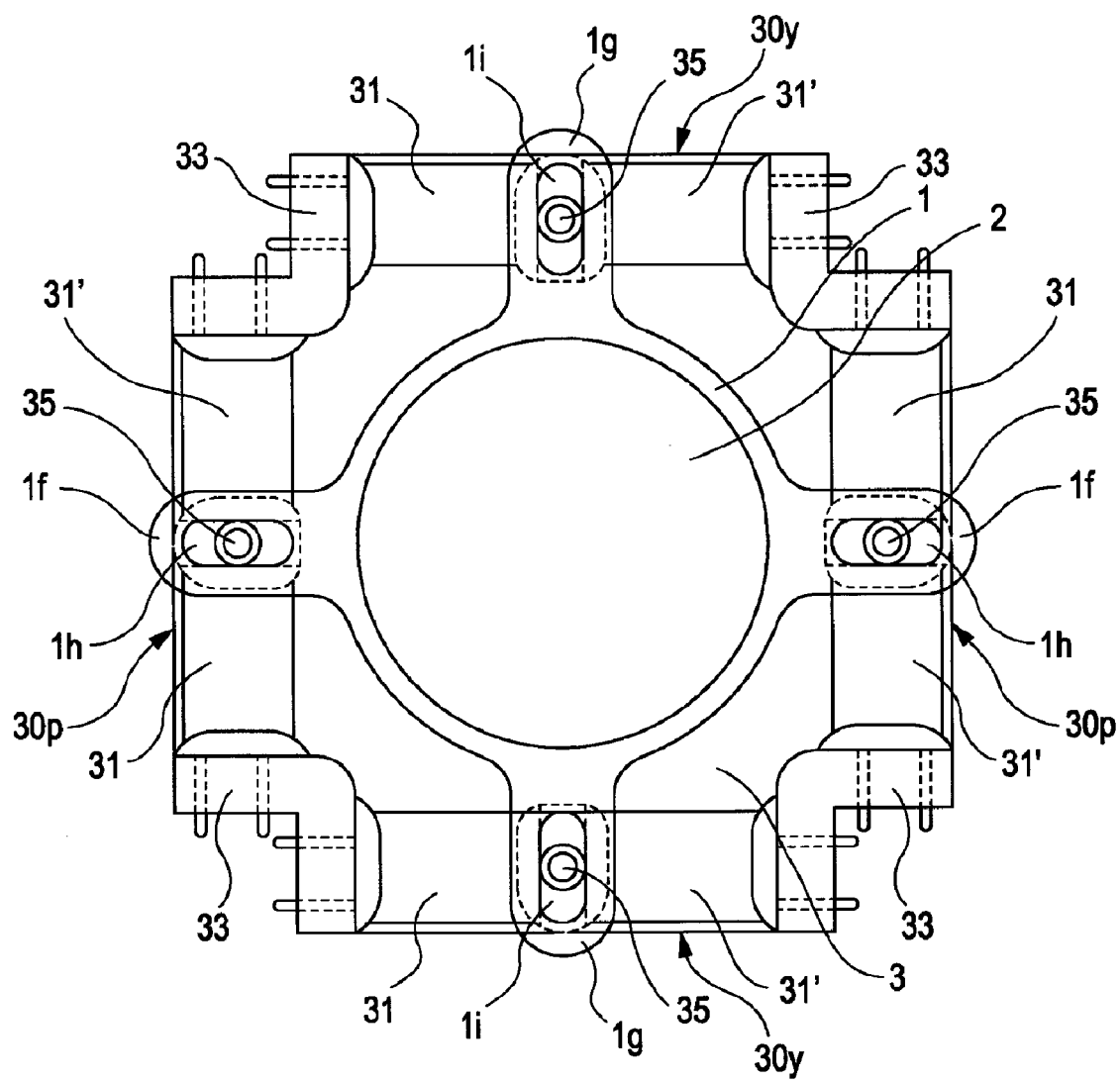
FIG. 7 shows a structure of a blur correcting unit in an interchangeable lens according to a fourth embodiment.

FIG. 7 shows a structure of a blur correcting unit in a lens device.

In FIG. 7, reference numeral 1 denotes a lens holder that holds a correcting lens 2 at the center thereof. The correcting lens 2 is displaced in a plane perpendicular to an optical axis thereof through the lens holder 1 to allow light that is incident upon the correcting lens 2 to be deflected. Therefore, when camera shaking in a yaw direction (that is, in a direction of a horizontal axis in FIG. 7) and a pitch direction (that is, in a direction of a vertical axis in FIG. 7) is detected by a sensor, such as a vibratory gyroscope, and the correcting lens 2 is displaced so that the light is deflected in a direction opposite to the camera shaking, the camera shaking can be corrected.

Reference numeral 3 denotes a bottom board disposed in a lens barrel of the camera and serving as a base that supports a lens shift mechanism. Supporting members 1f and 1g that support the lens holder 1 are disposed at the lens holder 1. Each supporting member 1f has a yaw-direction slotted hole 1h, and each supporting member 1g has a pitch-direction slotted hole 1i extending orthogonal to the supporting members 1f, that is, in the pitch direction. Reference numerals 30y and 30y denote electroactive polymer actuator units that are disposed so as to be stretched and contracted in the yaw direction and so as to oppose each other with the lens holder 1 being disposed therebetween. Reference numerals 30p and 30p denote electroactive polymer actuator units that are disposed so as to be stretched and contracted in a direction that is orthogonal to the actuator units $30y$ and $30y$, that is, in the pitch direction and so as to oppose each other with the lens holder 1 being disposed therebetween. The actuator units $30p$ and $30y$ each include actuator elements (polymers) 31 and 31', holding members 33 and 33', and a key 35.

Two slotted holes $1h$ are formed so as to displace the lens holder 1 only in the yaw direction. Two slotted holes $1e$ are formed so as to drive the lens holder 1 only in the pitch direction. Since the actuator keys 35 are fitted to their respective slotted holes $1h$ and $1i$, the two actuator units $30p$ and $30p$ are driven at the same time and with the same phase and displacement, and the two actuator units $30y$ and $30y$ are driven at the same time and with the same phase and displacement, so that a total of four actuators are driven while being stretched and contacted. This causes the lens holder 1 to be displaced in two directions, the pitch direction and the yaw direction, with respect to the bottom board 3, that is, in the plane that is perpendicular to the optical axis thereof.

By virtue of the above-described structure, it is possible to drive the correcting lens with a high output, so that a large and heavy lens can also be driven. Although, in the above-described structure, two-phase electroactive polymer actuators are used, one-phase electroactive polymer actuators may also be used as in the second embodiment.

Fifth Embodiment

A fifth embodiment of the present invention will be described with reference to FIG. 8.

Figure 8:
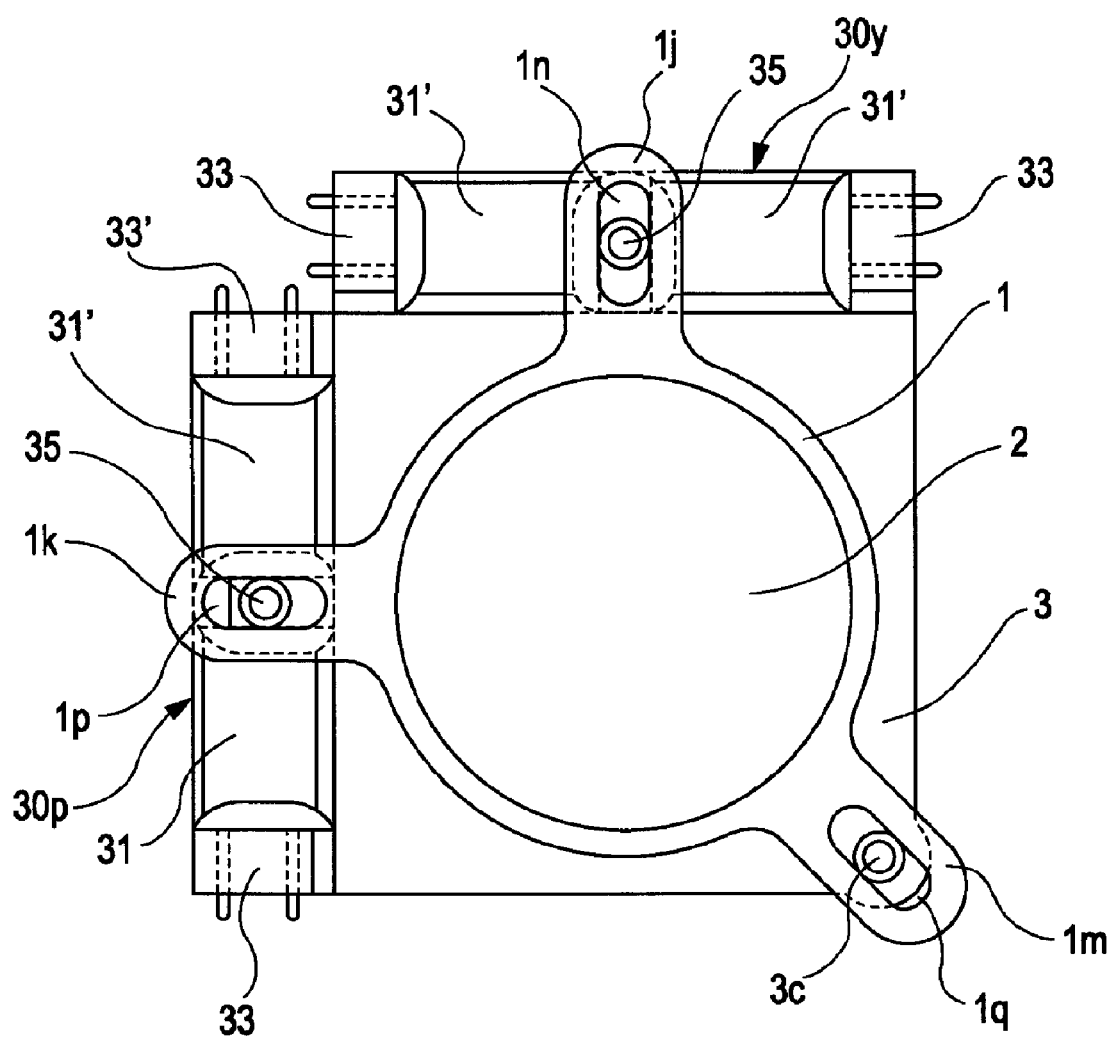
FIG. 8 shows a structure of a blur correcting unit in an interchangeable lens according to a fifth embodiment.

FIG. 8 shows a structure of a blur-correcting unit in a lens device.

In FIG. 8, reference numeral 1 denotes a lens holder that holds a correcting lens 2 at the center thereof. Through the lens holder 1, the correcting lens 2 is displaced in a plane that is perpendicular to an optical axis thereof to allow light that is incident upon the correcting lens 2 to be deflected. Therefore, when camera shaking in a yaw direction (that is, in a direction of a horizontal axis in FIG. 8) and a pitch direction (that is, in a direction of a vertical axis in FIG. 8) is detected by a sensor, such as a vibratory gyroscope, and the correcting lens 2 is displaced so that the light is deflected in a direction opposite to the camera shaking, the camera shaking can be corrected.

Reference numeral 3 denotes a bottom board disposed in a lens barrel of the camera and serving as a base that supports a lens shift mechanism. Supporting members $1j$, $1k$, and $1m$ that support the lens holder 1 are disposed at the lens holder 1. The supporting member $1j$ has a pitch-direction slotted hole $1n$, the supporting member $1k$ has a yaw-direction slotted hole $1p$, and the supporting member $1m$ has a slotted hole $1q$. The slotted hole $1q$ is formed at the most suitable angle that does not allow the lens holder 1 and the correcting lens to fall in the direction of the optical axis of the lens 2 (that is, the thrust direction). Although, in the embodiment, the slotted hole $1q$ is set at a position that is at an angle of 135 degrees counterclockwise from the slotted hole $1n$ and that is at an angle of 135 degrees clockwise from the slotted hole $1p$, depending upon relationships with other parts, it does not have to be set at this position in terms of design.

Reference numeral $30y$ denotes an electroactive polymer actuator unit that is disposed so as to be stretched and contracted in the yaw direction. Reference numeral $30p$ denotes an electroactive polymer actuator unit that is disposed so as to be stretched and contracted in a direction that is orthogonal to the actuator unit $30y$, that is, in the pitch direction. The actuator units $30p$ and $30y$ each include actuator elements (polymers) 31 and 31', holding members 33 and 33', and a key 35.

The actuator keys 35 are fitted to their respective slotted holes in and $1p$, and a protrusion $3c$ on the bottom board 3 and the slotted hole $1q$ are fitted together. Therefore, when the two actuator units $30p$ and $30y$ are driven while being stretched and contracted, the lens holder 1 is displaced in two directions, the pitch direction and the yaw direction, with respect to the bottom board 3, that is, in the plane that is perpendicular to the optical axis thereof. Although, in the above-described structure, two-phase electroactive polymer actuators are used, one-phase electroactive polymer actuators may also be used as in the second embodiment.

Sixth Embodiment

A sixth embodiment of the present invention will be described with reference to FIGS. 9 and 10.

Figure 9:
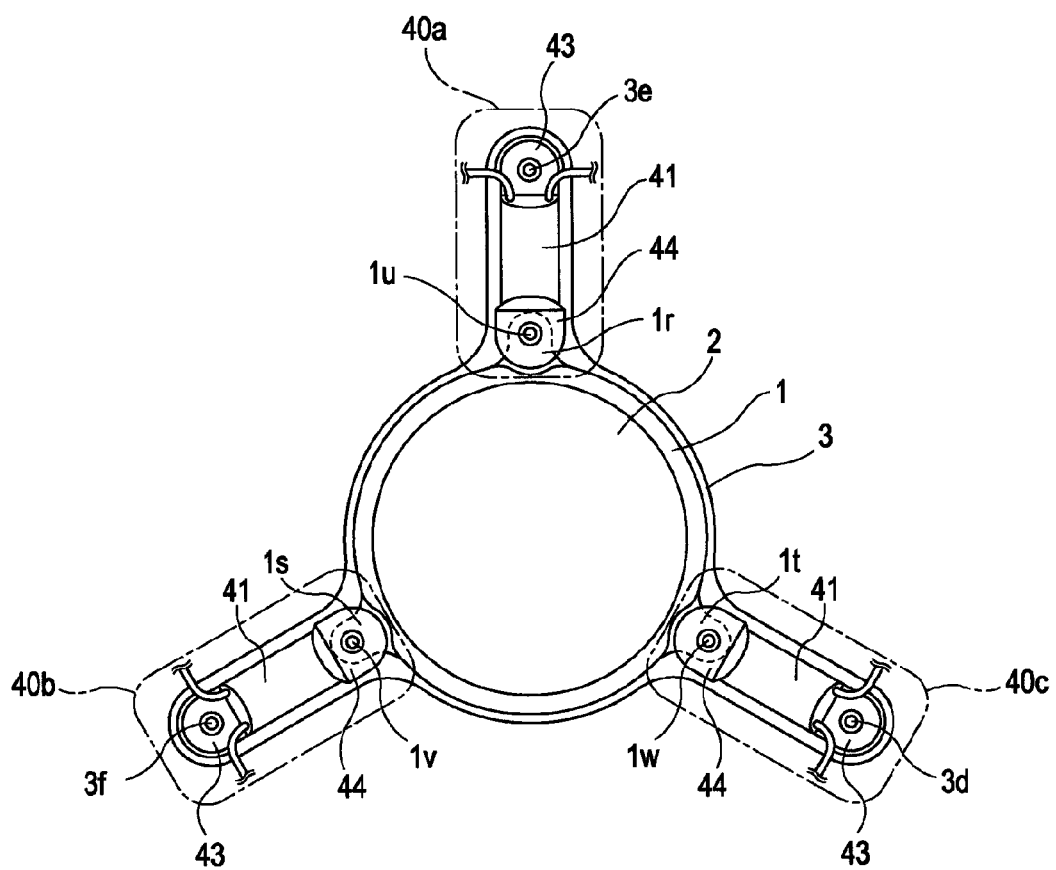
FIG. 9 shows a structure of a blur correcting unit in an interchangeable lens according to a sixth embodiment.

FIG. 9 shows a structure of a blur correcting unit in a lens device.

In FIG. 9, reference numeral 1 denotes a lens holder that holds a correcting lens 2 at the center thereof. Three actuator units $40a$, $40b$, and $40c$, formed of electroactive polymer, are disposed at equal distances from each other on the same outer circumference of the lens holder 1. Driving the actuator units $40a$, $40b$, and $40c$ in a plane that is orthogonal to the optical axis makes it possible to deflect light that is incident upon the correcting lens 2. Therefore, when camera shaking in a yaw direction (that is, in a direction of a horizontal axis in FIG. 9) and a pitch direction (that is, in a direction of a vertical axis in FIG. 9) is detected by a sensor, such as a vibratory gyroscope, and the correcting lens 2 is displaced so that the light is deflected in a direction opposite to the camera shaking, the camera shaking can be corrected. Here, the structure of the one-phase electroactive polymer actuator units $40a$, $40b$, and $40c$ will be described with reference to FIGS. 9 and 10.

Reference numerals 41 denote cylindrical actuator elements formed of electroactive polymer. Although, in U.S. Pat. No. 6,891,317, the use of acrylic material or silicon dielectric elastomer is disclosed, the embodiment is not particularly limited thereto.

Holding members 42 and 43 are mechanical members for holding the actuator elements (polymers) 41, and are secured to both ends of the actuator elements 41 with an adhesive. Each holding member 43 is a fixed end that is fixed to a base member, and each holding member 42 is a movable end. Each holding member 42 has a key 44 for being mechanically linked to the lens holder 1. In the embodiment, each key 34 is used to extract driving power of the actuator unit. For example, a helical compression spring (not shown) is provided between the holding members 42 and 43 to prevent buckling of each of the actuator elements (polymers) 41.

Next, the setting of an initial position of each actuator unit according to the present invention will be described.

When voltage is applied to one-phase electroactive polymer actuator units, they are stretched. When electroactive polymer actuator units are used in the blur correcting device, the actuator units need to be stretched and contracted. Therefore, it is necessary to stretch the electroactive polymer actuator units by a certain amount as a result of previously applying a certain amount of voltage to the electroactive polymer actuator units (pre-charging operation), to increase or decrease voltage from the predetermined voltage, and to make them appear as if they are stretched or contracted. In a related blur correcting unit, when a power supply is turned on, a resetting operation is performed to return a correcting lens to its predetermined position. In the actuator units according to the embodiment having the above-described structure, however, the resetting operation can be omitted. In addition, at the initial position, electric power for positioning the actuator units is not required, so that electric power can be saved. In the embodiment, an initial reset position is set so that the center of the correcting lens defines an optical axis. In other words, the actuator units 40a, 40b, and 40c are set in a balanced state and secured so that, when voltage is not applied to the actuator units, the movable ends 42 of the actuator units are pulled and the central position of the correcting lens coincides with the optical axis of the lens barrel. The positions where the actuator units are secured are not limited to the optical axis center and the center of the correcting lens, so that they may be secured at any predetermined positions that are suitable for the optical device.

In FIG. 9, reference numeral 3 denotes a base member disposed in the lens barrel of a camera. The fixed ends 43 of the actuator units are secured to respective supporting members 3d, 3e, and 3f formed at the base member 3. Supporting members 1r, 1s, and 1t, formed at the lens holder 1, and the keys 44, provided at the movable ends 42 of the actuator units, are linked to each other by respective low-friction linking members 1u, 1v, and 1w, such as bearings or rollers. By virtue of such a structure, the actuator units 40a, 40b, and 40c are connected to the lens holder 1 by three parts. This makes it possible to drive the correcting lens 2 in a plane that is perpendicular to the optical axis thereof.

Although, in the foregoing embodiments, the actuator elements are cylindrical electroactive polymer actuator elements shown in FIGS. 3A and 3B, they may be circular-sheet polymer actuator elements. A circular-sheet polymer actuator element will hereunder be described with reference to the relevant figures.

Figure 13:
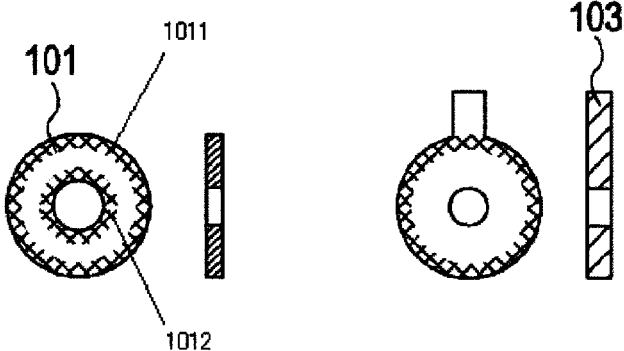
Figure 14:
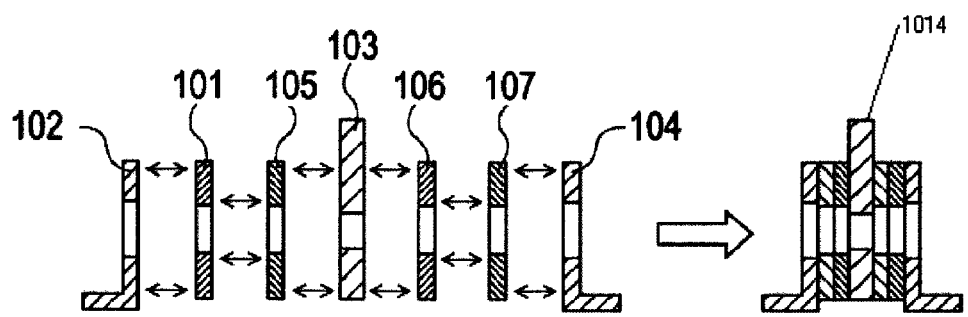

FIGS. 13, 14, and 15 illustrate a circular-sheet polymer actuator unit. In these figures, reference numerals 101, 105, 106, and 107 denote sheet electroactive-polymer actuator elements that have the same size and are formed in an annular shape. Although the polymer used in this structure is an acrylic material or silicon dielectric elastomer, which is disclosed in U.S. Pat. No. 6,891,317, or a material having the characteristics discussed in Table 1 in "J D W. Madden, Artificial Muscle Technology: Physical Principles and Naval Prospects, IEEE JOURNAL OF OCEANIC ENGINEERING, VOL. 29, NO. 3, JULY 2004," the polymer used is not limited thereto. Electrodes, such as those formed of stretchable and compressible carbon, are formed on the front and back of the polymer. The method of forming the electrodes and the material of the electrodes are not limited to any particular method and material, respectively.

Holding members 102, 103, and 104 are mechanical members for holding the actuator element 101. The actuator element 101 and the holding members are secured to each other by welding or with an adhesive. Shaded portions in FIGS. 13 and 14 correspond to the welded or adhered portions. FIG. 14 shows the welded or adhered portions of the component parts in the entire structure by arrows. The holding member 102 and the actuator element 101 are welded or adhered to each other at a shaded portion 1011 near an annular outer peripheral portion of the actuator element 101. The actuator elements 101 and 105 are welded or adhered to each other at a shaded portion 1012 near an annular inner peripheral portion of the actuator element 101. The actuator element 105 and the holding member 103 are welded or adhered to each other at a shaded portion 1011 near an annular outer peripheral portion. The actuator elements 106 and 107 are similarly welded or adhered to each other and to their respective parts. This forms the actuator elements into the form of a bellows. After welding or adhering the parts to each other as shown in FIG. 14, a shaft 108 having a step secures the holding members 102 and 104 so that the distance between them is widened. A threaded portion 108a of the shaft 108 and a threaded hole 102a of the holding member 102 are screwed and adhered to each other and are locked. The holding member 103 and the shaft 108 slide with respect to each other at low friction. A low-friction coating, such as Teflon, or a lubricant, such as commercially available grease, may be applied to either one or both of the shaft 108 and the holding member 103. This embodiment is not limited to the shaft 108, so that a flat plate may be used to determine the entire length of the actuator unit as in the first embodiment described with reference to FIGS. 3A and 3B. The shaft 108 is used to apply a pre-strain to the actuator elements 101, 105, 106, and 107, and is secured to the actuator elements in a stretched state. As mentioned above, it is widely known that properties of actuator units, such as electrostatic breaking strength, can be improved as a result of applying a pre-strain to a polymer.

The distinctive features of this embodiment are that the holding members 102 and 104 are kept apart from each other while the actuator elements 101, 105, 106, and 107 are stretched and that force and displacement are smoothly provided from the center side surfaces of the actuator elements that are in the form of a bellows. As in the structure of the actuator unit shown in FIG. 3, the holding member 103 has a key 1014 for being mechanically connected to the lens holder. Although, in this embodiment, four circular-sheet actuator elements (polymer sheets) are used, for example, only two of the actuator elements, the actuator elements 101 and 106, may be used. Alternatively, it is possible to use many sheets (such as six, eight, or ten sheets), instead of four sheets, by similarly connecting these sheets together; or to set the number of sheets in accordance with the conditions of use. Although the portion where the actuator elements 101 and 105 are secured to each other and the portion where the actuator elements 106 and 107 are secured to each other are at the annular inner peripheral sides, they may be at the annular outer peripheral sides. In that case, the holding member 102 and the actuator element 101, the actuator element 105 and the holding member 103, the holding member 103 and the actuator element 106, and the actuator element 107 and the holding member 104 are secured to each other at the annular inner peripheral sides.

The polarities of the electrodes are set so that the outer sides of the actuator elements become ground. The inner sides of the actuator elements are where voltage is high. By virtue of this structure, it is possible to prevent, for example, electrical discharge to other parts in the lens barrel.

As regards the cylindrical actuator unit shown in FIG. 10, a circular-sheet actuator unit shown in FIG. 16 may be used instead of the cylindrical polymer actuator shown in FIG. 10.

In each of the foregoing embodiments, the blur correcting lens of the interchangeable lens is driven by actuator units formed of electroactive polymer, in the optical device (camera system) comprising the interchangeable lens and the camera.

An optical device (image pickup device), such as a digital still camera or a video camera, in which a blur correcting lens is driven by actuators formed of electroactive polymer will be described below.

Seventh Embodiment

Figure 17:
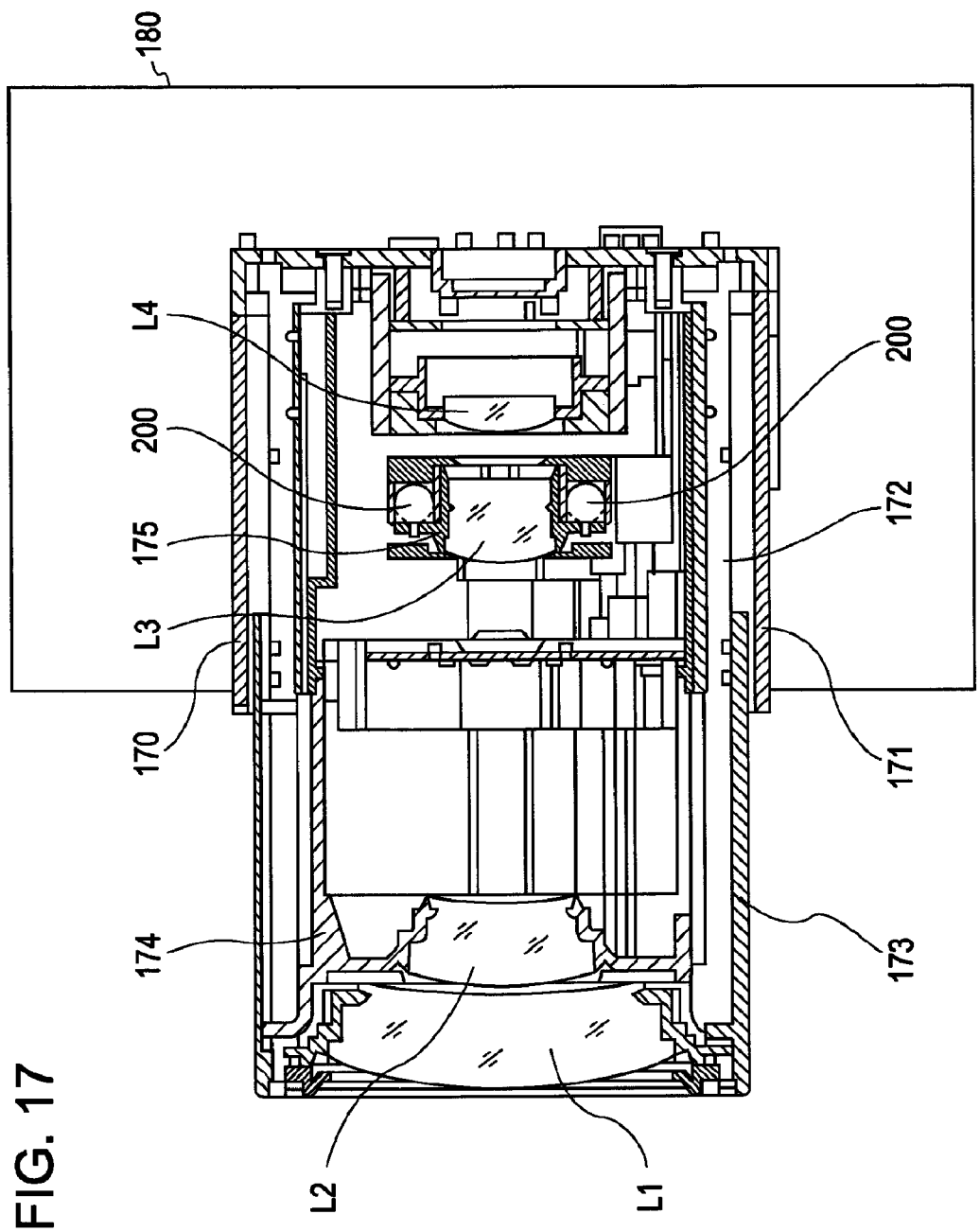
FIG. 17 shows a camera according to a seventh embodiment.

FIG. 17 shows a camera (image pickup device, such as a digital still camera or a video camera) according to a seventh embodiment.

In FIG. 17, reference numeral 170 denotes a lens barrel, and reference numeral 180 denotes a camera body. The lens barrel 170 is a collapsible-type lens barrel in which a lens is accommodated in and extended from the camera body 180. L1 denotes a first lens unit that is fixed during magnification change, L2 denotes a second lens unit that moves during the magnification change, L3 denotes a third lens unit that corrects blurring, and L4 denotes a fourth lens unit that moves during focusing. Reference numeral 171 denotes a fixed lens barrel portion and reference numeral 172 denotes a cam cylinder. Rotation of the cam cylinder 172 causes a first lens barrel portion 173, which holds the first lens unit L1, and a second lens barrel portion 174, which holds the second lens unit L2, to move from their accommodated positions in the camera body 180 to their shooting positions (shown in FIG. 17). Further rotation of the cam cylinder 172 causes the second lens barrel portion 174 to move for zooming. The third lens unit L3 is held by a third lens barrel portion 175 that is movable in a plane that is perpendicular to the optical axis. Reference numerals 200 and 200 denote actuator units that move the third lens barrel portion 175, which is a blur correcting lens unit, in the plane that is perpendicular to the optical axis. The structure of the actuator units 200 is the same as that of the actuator unit shown in FIG. 3, so that the details of the structure of the actuator units 200 will not be given below.

The structure of the blur correcting lens unit will be described with reference to FIGS. 18A and 18B.

Figure 18A:
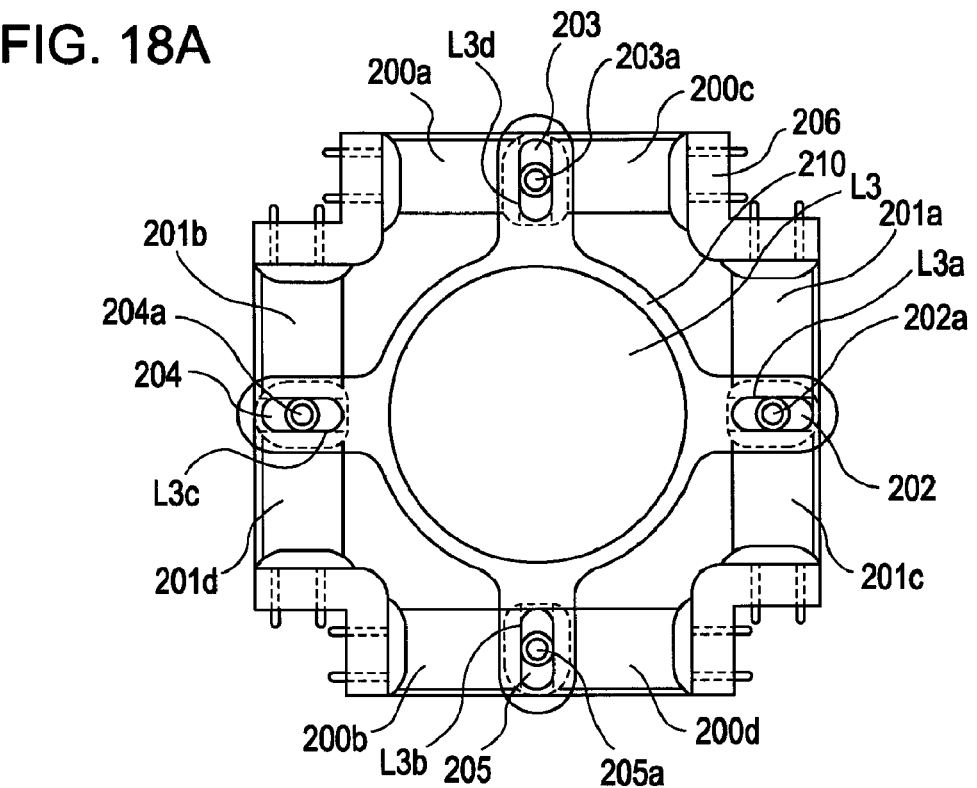
FIGS. 18A and 18B show a structure of a blur correcting unit according to the seventh embodiment.

In FIG. 18A, reference numerals 200$a$, 200$c$, 200$b$, and 200$d$ denote yaw-direction actuator elements, and reference numerals 201$a$, 201$c$, 201$b$, and 201$d$ denote pitch-direction actuator elements. Each actuator element is formed of electroactive polymer. Reference numerals 202, 203, 204, and 205 are movable holding members that are held between the two actuator elements corresponding thereto. Reference numeral 206 denotes an actuator holding member (base member) that sandwich and hold each actuator element. Connecting bosses 202$a$, 203$a$, 204$a$, and 205$a$ are formed in the respective holding members 202, 203, 204, and 205.

When sets including two actuator elements and one movable holding member are formed, these sets are successively disposed in four directions so as to be separated by 90 degrees from each other with reference to the optical axis. These directions are along the directions of stretching and contraction of the actuator elements.

The connecting bosses 202$a$, 203$a$, 204$a$, and 205$a$, disposed at the respective holding members 202, 203, 204, and 205, engage four respective slotted holes L3$a$, L3$d$, L3$c$, and L3$b$, formed in a lens holding member 210. The long sides of the slotted holes L3$a$, L3$b$, L3$c$, and L3$d$ are disposed perpendicular to the directions of movement of the movable holding members 202, 205, 204, and 203.

Reference numeral 207 denotes a wire for applying driving voltage from the actuator element 200$a$ to the actuator element 200$d$ and from the actuator element 201$a$ to the actuator element 201$d$. The wire 207 is a wire that conducts output voltage from sensors when the actuator elements serve as the sensors.

FIG. 18A shows a non-electrification state in which voltage is not applied to the actuator elements. The center of the third lens unit L3 is the position corresponding to the optical axis. This is because tensile force from the actuator element 200$a$ to the actuator element 200$d$ and tensile force from the actuator element 201$a$ to the actuator element 201$d$ are in equilibrium due to the aforementioned pre-strain. In the embodiment, when a lens unit is to be positioned at the optical axis, electrification is not required, thereby making the structure very advantageous from the viewpoint of saving energy during shooting.

Figure 18B:
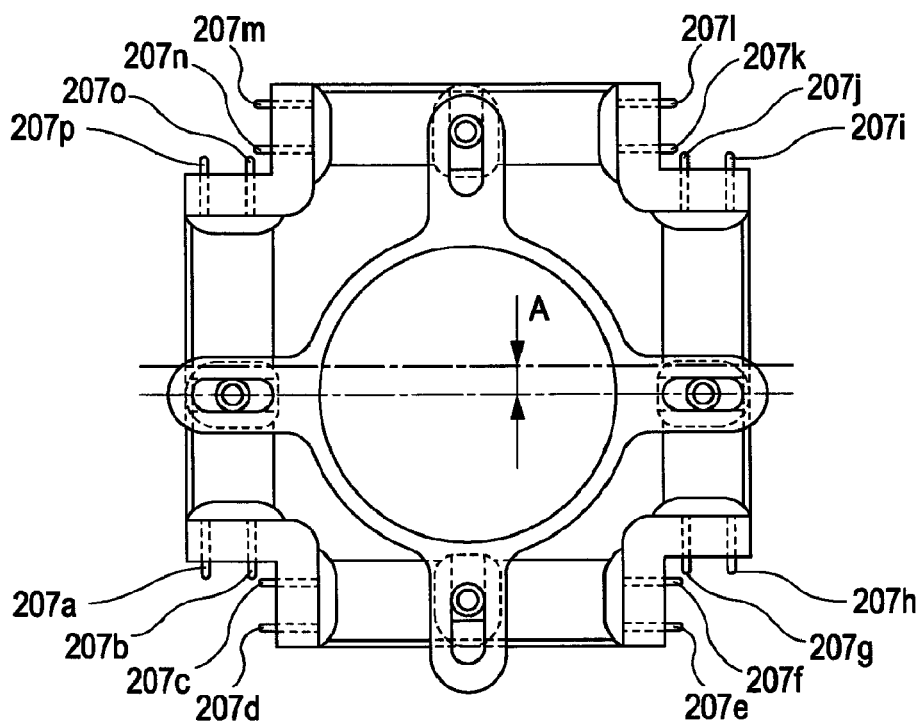

FIG. 18B shows a state in which the third lens unit L3 is driven by a movement amount A in the pitch direction in this structure. The actuator elements 201$a$ and 201$b$ are stretched in accordance with an output from a controlling circuit (not shown) of the camera body 180 shown in FIG. 17. Here, although electrical current is not passed through the actuator elements 201$c$ and 201$d$, the actuator elements 201$c$ and 201$d$ are compressed by tensile force produced by pre-strain, so that the movable holding members 202 and 204 move by the movement amount A in the pitch direction.

Accordingly, in the embodiment, driving each of the actuator elements in accordance with a blurring state makes it possible to drive the third lens unit L3 in the plane that is perpendicular to the optical axis.

Figure 19:
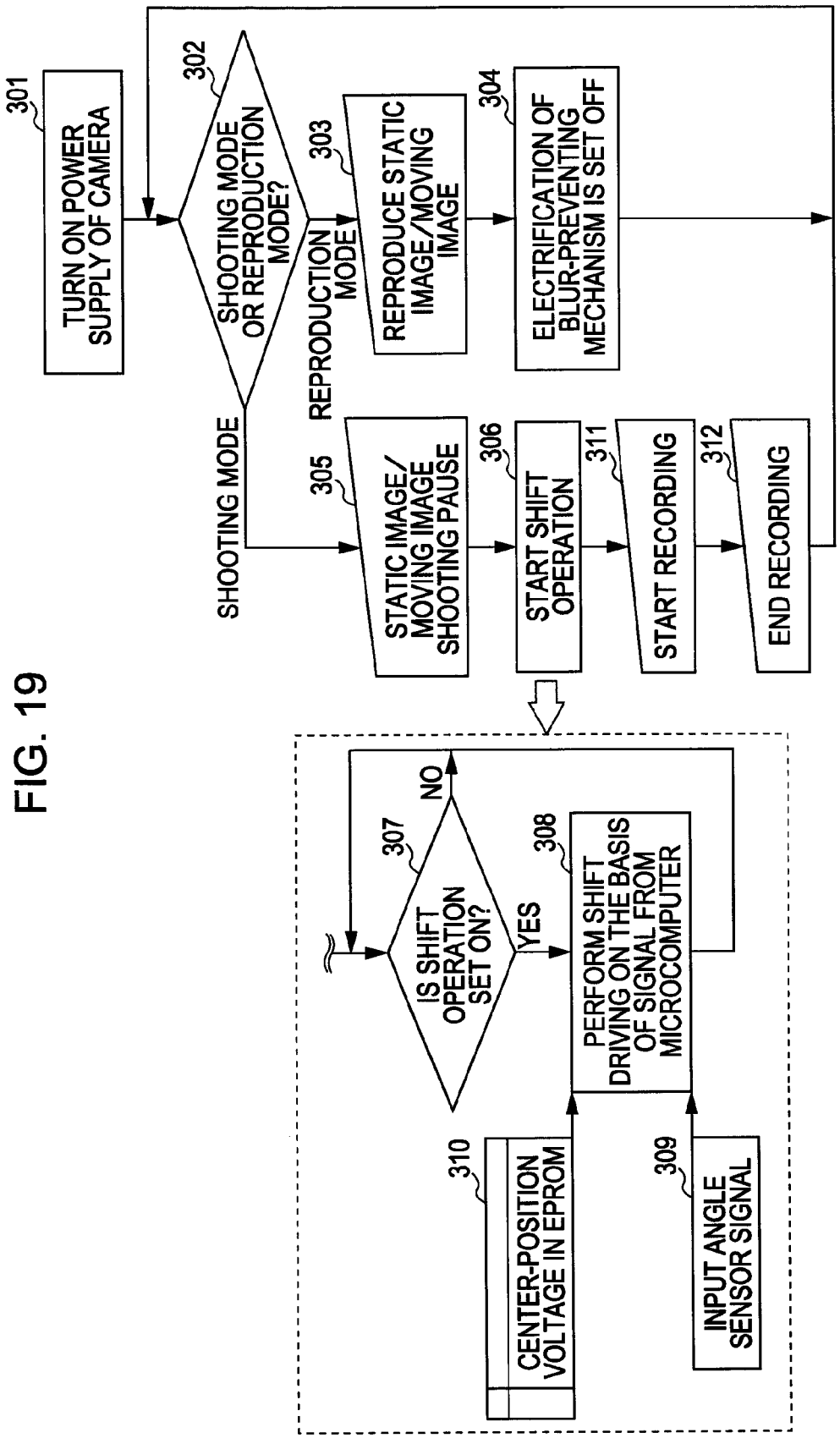
FIG. 19 is a flowchart of the steps of operating the blur correcting unit according to the seventh embodiment.

The operation of the blur correcting unit according to the embodiment will be described with reference to the flowchart shown in FIG. 19. Here, the operation of preventing blurring in a shooting device, such as a video camera or a digital still camera, having a moving-image shooting mode and a static-image shooting mode will be described.

When, in Step 301, a power supply of the camera is turned on, a determination is made as to whether the camera is in a shooting mode in Step 302. If it is not in a shooting mode, the process proceeds to Step 303 to reproduce a still image or a moving image because it is in a reproduction mode. Then, the process proceeds to Step 304, in which, when the camera is in a reproduction mode, an electrification setting of a blur preventing mechanism is kept off (that is, electrical current is not supplied to the actuator elements).

When, in Step 302, the camera is in a shooting mode, the process proceeds to Step 305, so that the camera is set in a static-image or a moving-image shooting pause state. Then, the process proceeds to Step 306 to set a state in which a blur prevention operation can be started. In the blur prevention operation, first, a determination is made as to whether or not a shift operation setting is on in Step 307. If the shift operation setting is not on, the process remains at Step 307. If it is on, the process proceeds to Step 308 to shift-drive the third lens unit as a result of supplying electrical current to the actuator elements by the controlling circuit. For Step 308, an output from an angle sensor, such as a vibratory gyroscope, is input by carrying out Step 309. If the central position of the third lens unit (that is, where it is held when electrical current is not supplied) is displaced from the optical axis, the displacement amount is stored in EPROM, and information from EPROM is read in Step 310. After correcting the shifted central position, in Step 308, the third lens unit is shift-driven. When the shifting is started in Step 306, the proceeds to Step 311. When a recording start button is set on, recording is started. When a recording stop button is operated, the recording is stopped in Step 312.

Eighth Embodiment

The structure of a blur correcting unit according to an eighth embodiment of the present invention will be described with reference to FIGS. 20A and 20B.

Figure 20A:
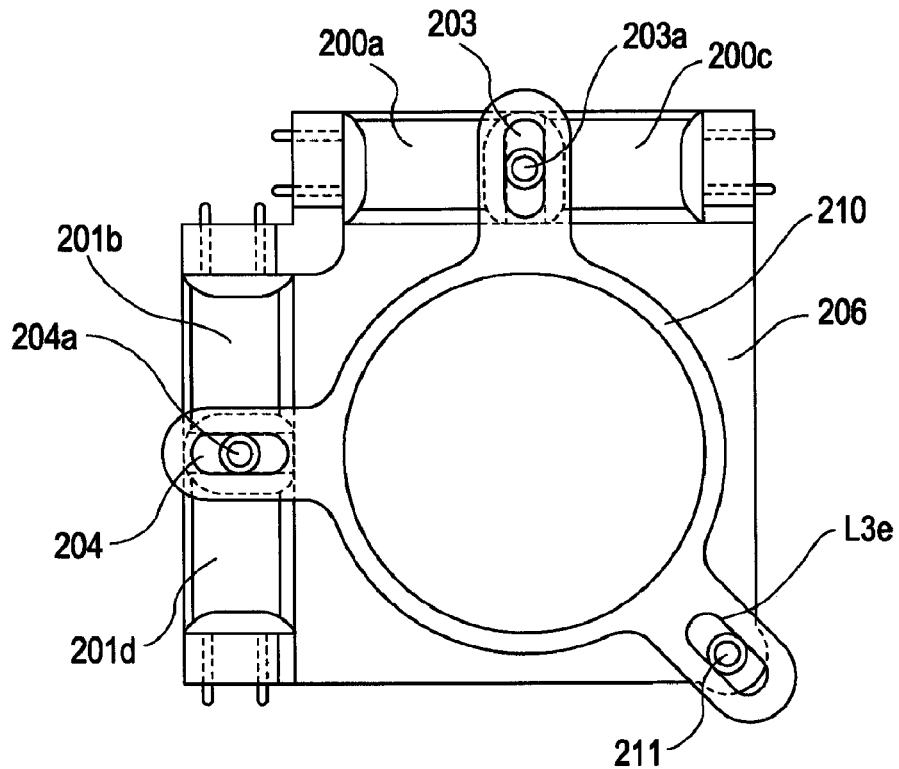
FIGS. 20A and 20B show a structure of a blur correcting unit according to an eighth embodiment.
Figure 20B:
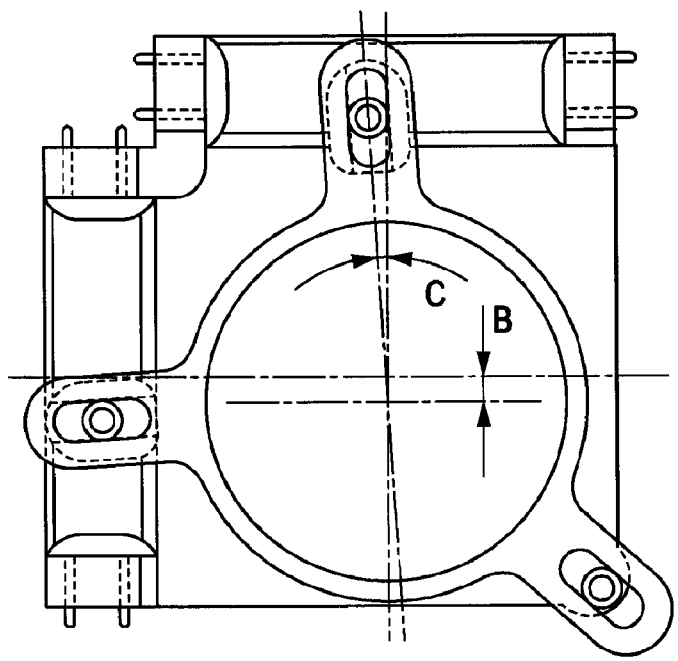

FIGS. 20A and 20B show the structure of a lens unit using two actuator units. One actuator unit is disposed for driving in a pitch direction, and one actuator unit is disposed for driving in a yaw direction. Reference numeral 211 denotes a fixed connecting boss disposed at an actuator holding member (base member) 206. The connecting boss 211 is disposed at an angle of 135 degrees from movable holding members 203 and 204 with the optical axis as the center. The connecting boss 211 engages a slotted hole L3$e$ formed in a lens holding member 210 that holds a third lens unit L3.

The eighth embodiment differs from the seventh embodiment in that the third lens unit L3 may swing or rotate in a driving plane. When the third lens unit L3 is to be driven downward in the pitch direction, in the seventh embodiment, the third lens unit L3 can be moved in the pitch direction if the pitch-side actuator elements are driven. In the eighth embodiment, the slotted hole L3e in the lens holding member 210 engages the fixed connecting boss 211, so that, as shown in FIG. 20B, when the third lens unit L3 is moved by a movement amount B in the pitch direction, the actuator elements are driven in the yaw direction to rotate the third lens unit L3 by an angle C. Accordingly, in the embodiment, the third lens unit L3 is driven in the pitch direction by driving the pitch-direction and yaw-direction actuator elements, and the third lens unit L3 is driven in the yaw direction by driving the yaw-direction and pitch-direction actuator elements, so that the third lens unit L3 is shifted.

Ninth Embodiment

A structure of a blur correcting unit according to a ninth embodiment of the present invention will be described with reference to FIG. 21.

Figure 21:
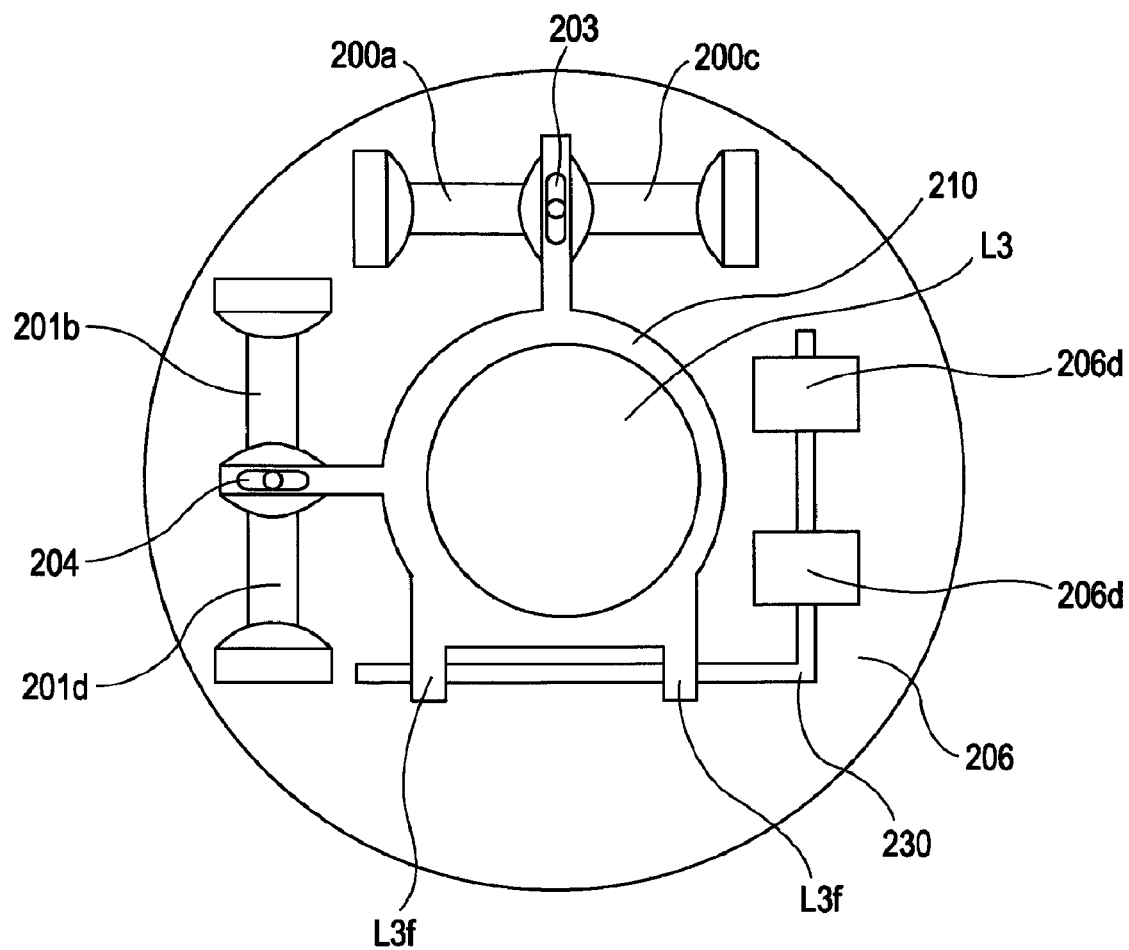
FIG. 21 shows a structure of a blur correcting unit according to a ninth embodiment.

In FIG. 21, reference numeral 230 denotes an L-shaped guide bar that guides a third lens unit L3 in a pitch direction and a yaw direction. The L-shaped guide bar 230 is held by fixed sleeves 206d and 206d of an actuator holding member (base member) 206 so as to be movable in the pitch direction. The L-shaped guide 230 is inserted in guide holes L3f and L3f in a lens holding member 210 that holds the third lens unit L3, so that the lens holding member 210 is movable in the yaw direction with respect to the L-shaped guide bar 230.

When the third lens unit L3 is to be moved in the pitch direction, driving an actuator element 201b or an actuator element 201d causes the L-shaped guide bar 230, held by the lens holding member 210, to be guided by the fixed sleeves 206d and 206d, so that the lens holding member 210 is moved in the pitch direction. When the third lens unit L3 is to be moved in the yaw direction, driving an actuator element 200a or an actuator element 200c causes the guide holes L3f and L3f, formed in the lens holding member 210, to be guided by the L-shaped guide bar 230, so that the lens holding member 210 moves in the yaw direction.

Tenth Embodiment

Figure 22:
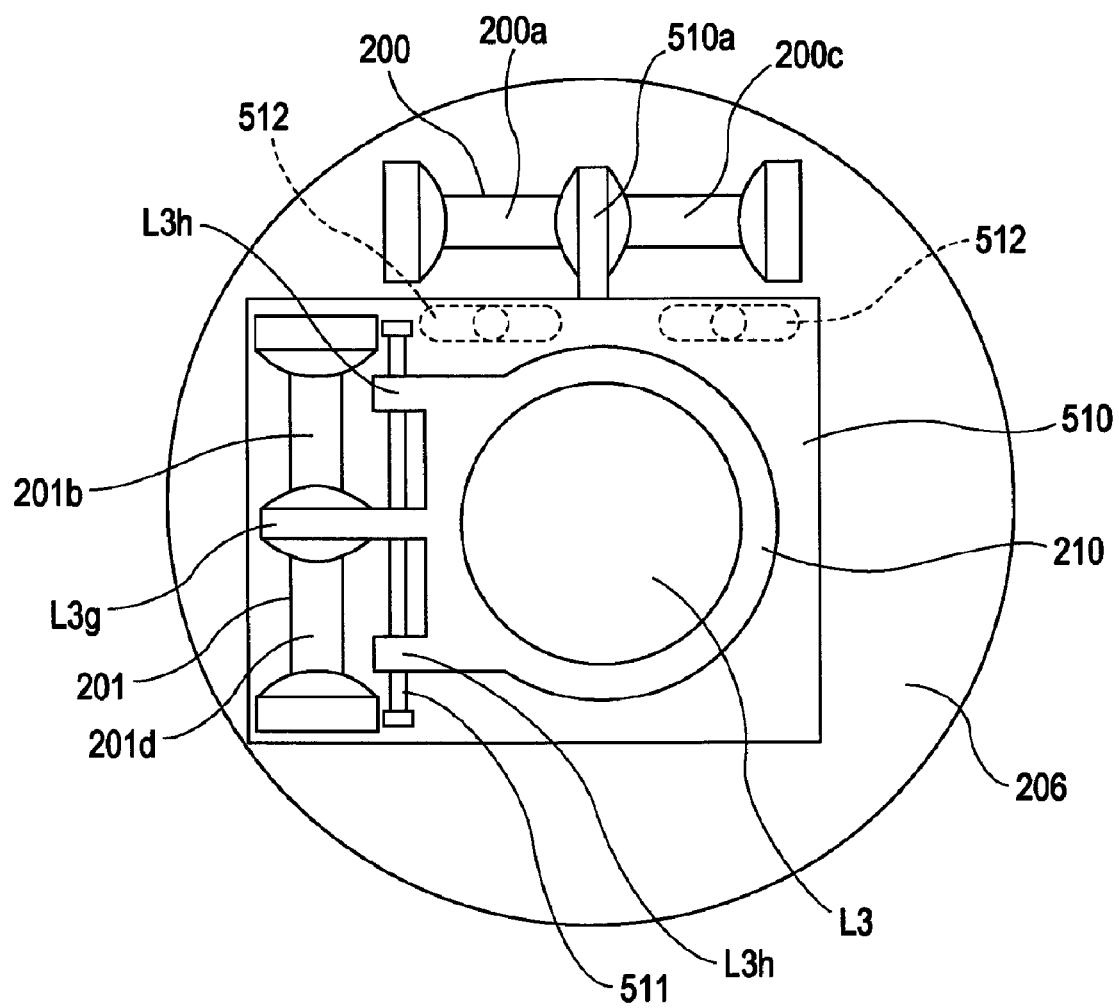
FIG. 22 shows a structure of a blur correcting unit according to a tenth embodiment.

A structure of a blur correcting unit according to a tenth embodiment of the present invention will be described with reference to FIG. 22.

In the embodiment, an actuator unit 200 is secured to an actuator holding member 206, and an actuator unit 201 is secured to a movable actuator holding member 510. When driving is performed in a pitch direction, actuator elements 201b and 201d that are disposed at the movable actuator holding member 510 are used, whereas, when driving is performed in a yaw direction, actuator elements 200a and 200c that are disposed at the actuator holding member 206 are used. When the driving is performed in the pitch direction, power is transmitted to a third lens unit L3 through a movable holding member L3g disposed between the actuator elements 201b and 201d. A lens holding member 210 is guided by a pitch-side guide bar 511 and a pitch-side sleeve L3h disposed at the third lens unit L3. When the driving is performed in the yaw direction, power is transmitted to the third lens unit L3 through a movable holding member 510a disposed between the actuator elements 200a and 200c. The movable actuator holding member 510 is guided in the yaw direction by guide slotted holes 512 and fixed bosses 206e and 206e disposed at the actuator holding member 206.

Eleventh Embodiment

A structure of a blur correcting unit according to an eleventh embodiment of the present invention will be given with reference to FIGS. 23A and 23B.

In the embodiment, one-phase electroactive polymer actuator units are used.

Figure 23A:
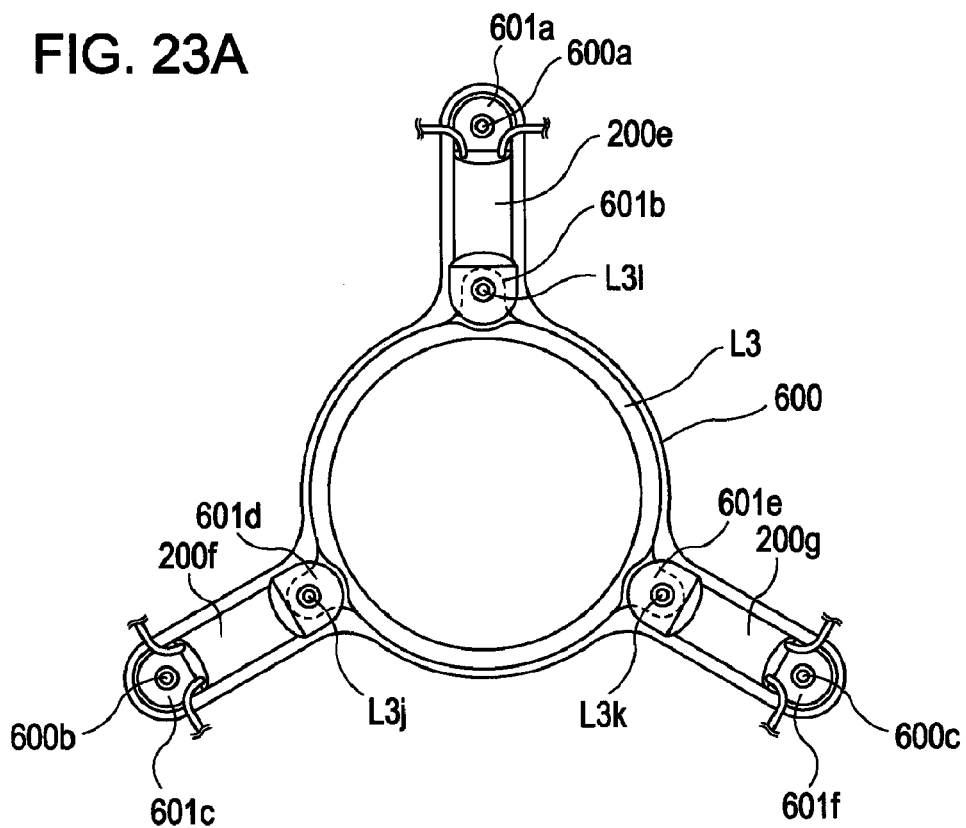
FIGS. 23A and 23B show a structure of a blur correcting unit according to an eleventh embodiment.
Figure 23B:
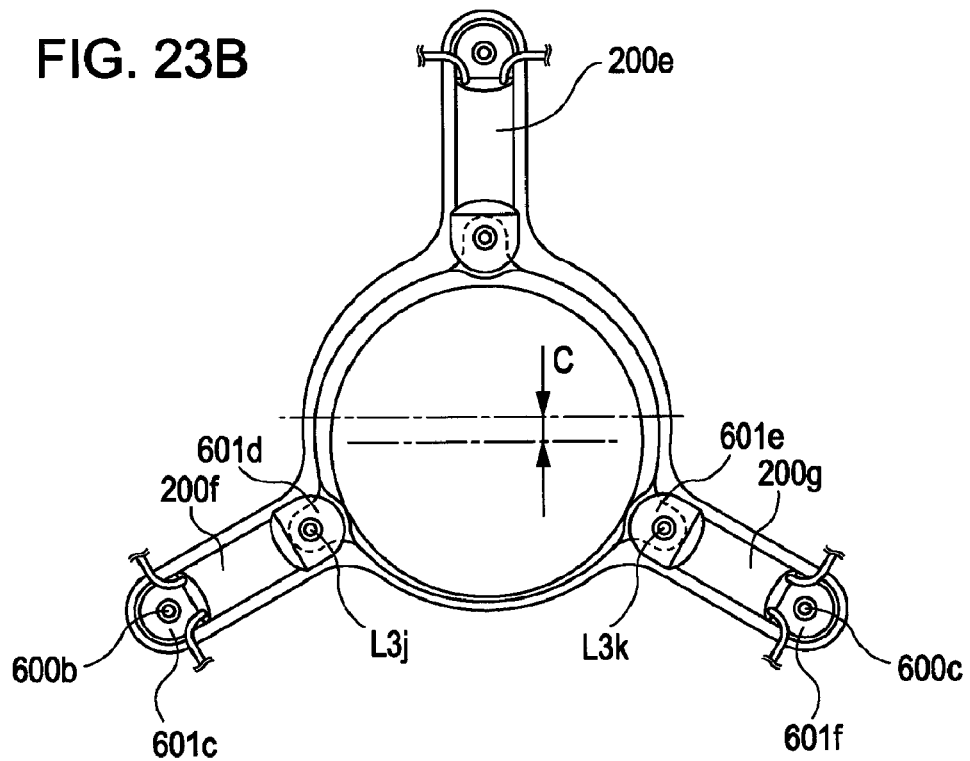

In FIGS. 23A and 23B, reference numerals 200e, 200f, and 200g denote actuator elements formed of electroactive polymer. The actuator element 200e is held between a rotary holding member 601a and a rotary holding member 601b, the actuator element 200f is held between a rotary holding member 601c and a rotary holding member 601d, and the actuator element 200g is disposed between a rotary holding member 601e and a rotary holding member 601f. The rotary holding members 601a, 601b, and 601c, and the rotary holding members 601d, 601e, and 601f are supported by connecting bosses 600a, 600b, and 600c, disposed at an actuator holding member 600, and by connecting bosses L3i, L3j, and L3k, disposed at a lens holding member of a third lens unit L3. While each rotary holding member is held by its corresponding boss, the corresponding actuator element is pulled and a pre-strain is applied thereto.

The actuator elements 200e, 200f, and 200g are disposed at an equal interval of 120 degrees with respect to an optical axis center of the third lens unit L3 so as to extend radially from the optical axis center.

When the third lens unit L3 is to be moved downward in the pitch direction, as shown in FIG. 23B, the actuator element 200e is stretched. Here, the actuator elements 200f and 200g are not stretched, but their rotary holding members 601c and 601d and rotary holding members 601e and 601f rotate around the connecting bosses 600a, 600b, and 600c and connecting bosses L3i, L3j, and L3k as centers, so that they follow the movement of the third lens unit L3. When the third lens unit L3 is to be moved in the yaw direction, it is driven by combining the stretchings of the actuator elements.

Although, in the above-described embodiment, cylindrical electroactive polymer actuator elements are used, electroactive polymer actuator elements in the form of a bellows, illustrated in FIG. 15, may also be used.

In the embodiments described thus far, electroactive polymer actuators are used to drive the lens of a shooting optical system of the camera in the plane perpendicular to the optical axis of the camera. Another embodiment in which electroactive polymer actuators are used to move an image pickup element, such as a CCD or a CMOS, in a camera will hereunder be described.

Twelfth Embodiment

Figure 24:
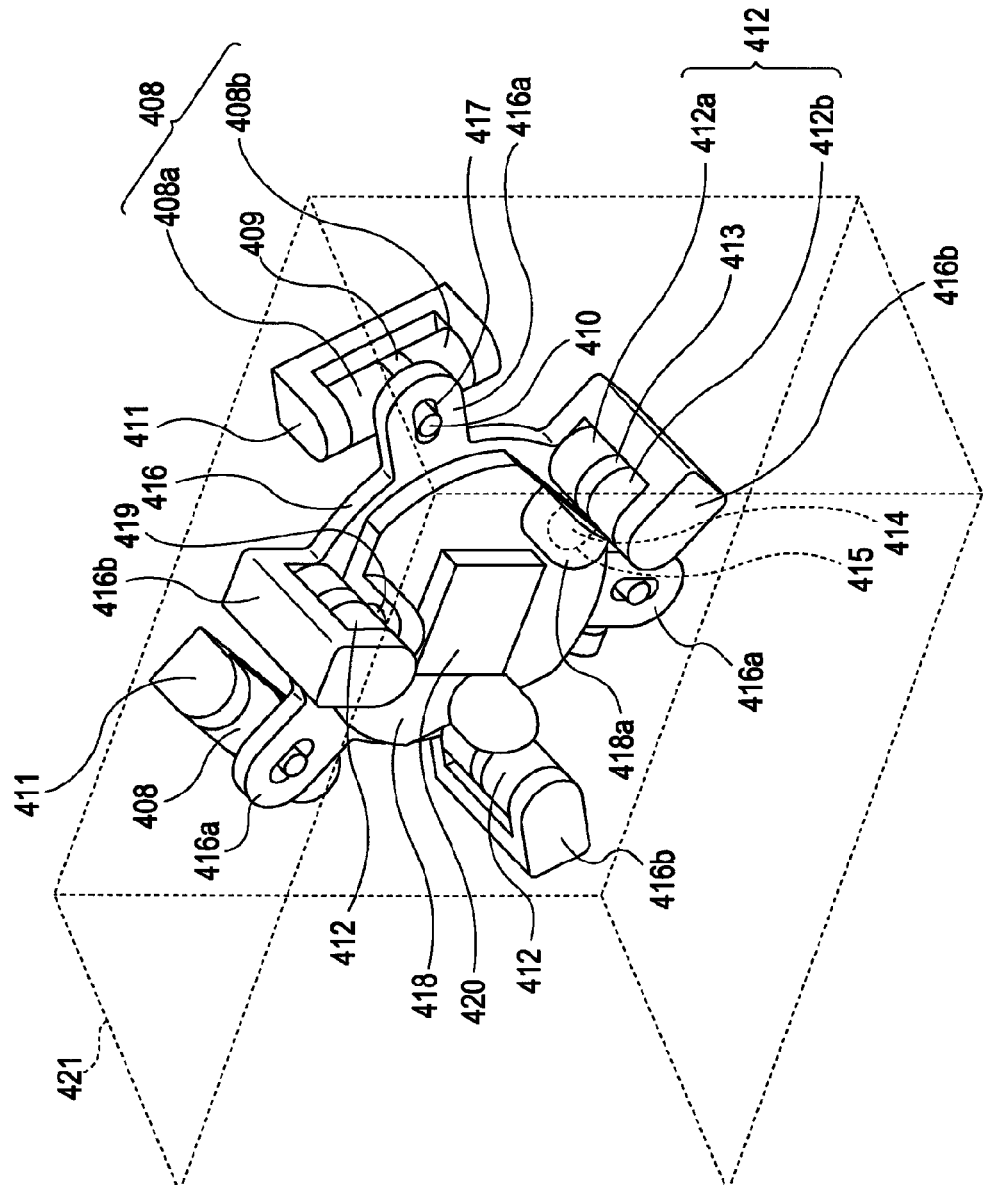
FIGS. 24 and 25 show a structure of an image-pickup-element driving unit according to a twelfth embodiment.
Figure 25:
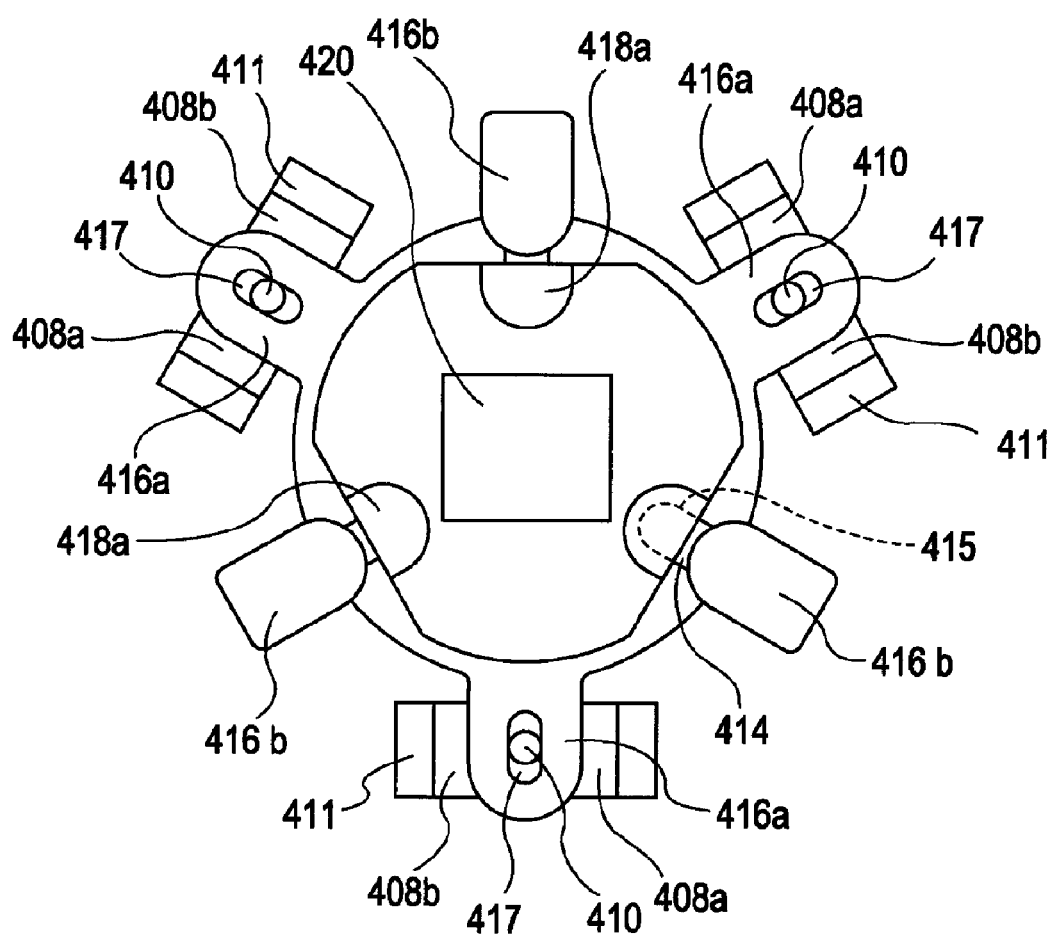

An image-pickup-element driving unit according to a twelfth embodiment of the present invention will be described with reference to FIGS. 24 and 25.

In the embodiment, the actuator structure shown in FIG. 3A is used. In FIGS. 24 and 25, reference numerals 408 denote three first actuator units. First actuator holding members 411 for the respective actuator units 408 are secured to a camera body 421, and hold actuator elements 408a and 408b. A holding member 409 is secured from its back side between the actuator elements 408a and 408b of each actuator unit 408. Pins 410 for taking out power are provided at the respective holding members 409.

Reference numeral 416 denotes a base member having protrusions 416a having slotted holes 417 that engage the respective pins 410. The protrusions 416a are disposed at an equal interval at three locations so as to extend radially, with an axis that is parallel to the optical axis and that passes through the center of an image pickup element serving as a symmetric axis. Second actuator holding members 416b that hold second actuator elements are provided at three locations of the base member 16. Second actuator units 412 are held by the second actuator holding members 416b. Each holding member 413 is adhered to a portion between second actuator elements 412a and 412b corresponding thereto. Each holding 413 has a pin 414, and a ball 415 is disposed at an end of its corresponding pin 414. Reference numeral 418 denotes an image-pickup-element holding member.

Protrusions 418a, each having a hole 419 engaging the corresponding ball 415, is provided at the image-pickup-element holding member 418. The protrusions 418a are disposed at three locations and at an equal interval so as to extend radially, with the axis that is parallel to the optical axis and that passes through the center of the image pickup element serving as the symmetric axis. The image-pickup-element holding member 418 holds an image pickup element 420.

Figure 26:
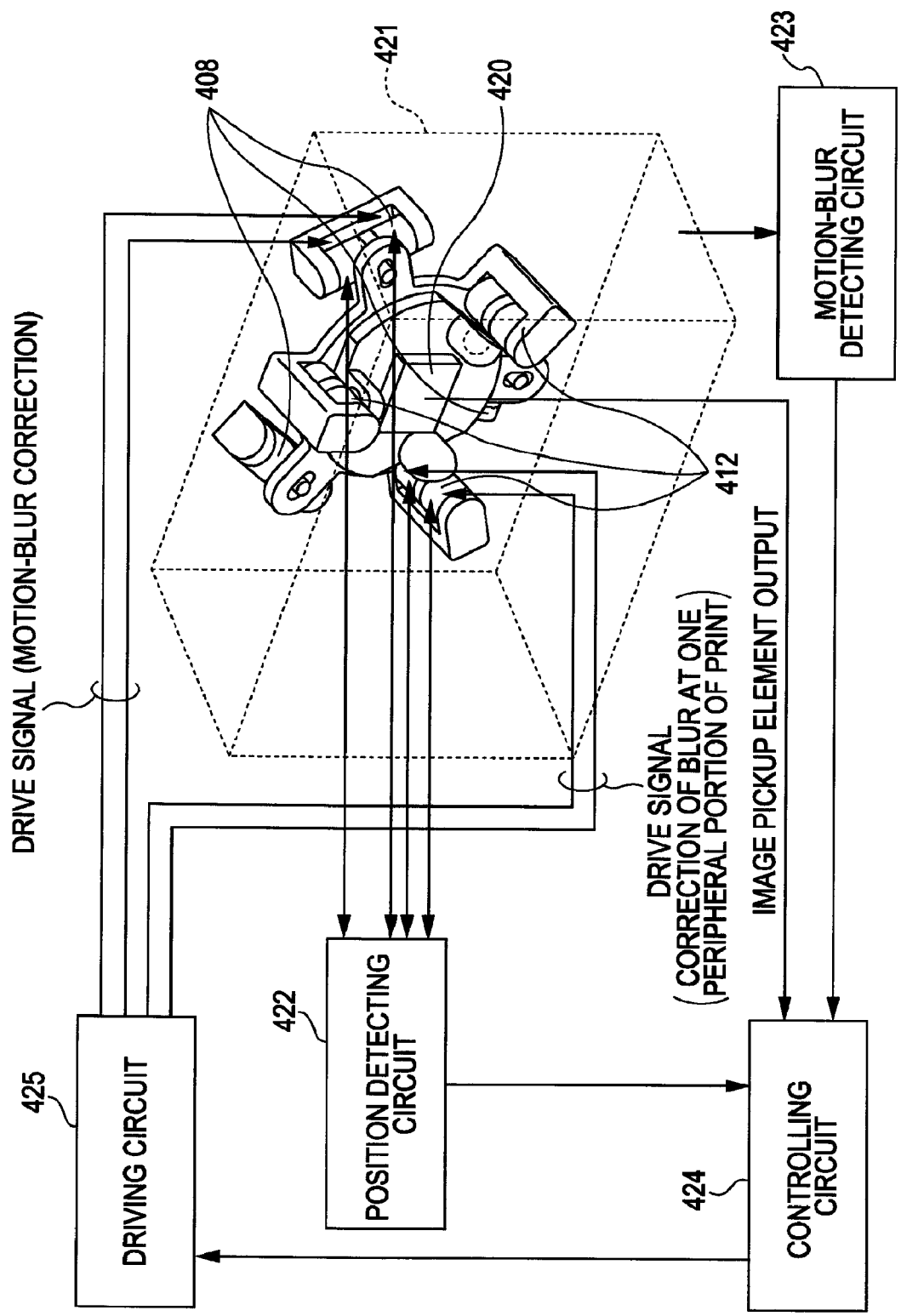
FIG. 26 is a block diagram of a circuit and the driving unit according to the twelfth embodiment.

FIG. 26 is a block diagram of a controlling circuit and the image-pickup-element driving unit according to the twelfth embodiment.

The image-pickup-element driving unit according to the embodiment is disposed in a camera 421. On the basis of a voltage supply to a sensor and an output signal from the sensor at a position detecting circuit 422, positional information of the image pickup element is transmitted to a controlling circuit 424. The sensor may be an attached external sensor, such as a photodetector, or a built-in sensor, such as one that detects a change in resistance or in electrostatic capacitance of an electroactive polymer. An output signal from a motion-blur detecting sensor (not shown), disposed at the camera 421, is processed by a motion-blur detecting circuit 423, and the processed signal is transmitted to the controlling circuit 424. The controlling circuit 424 monitors the signal from the position detecting circuit 422 and the signal from the motion-blur detecting circuit 423 to, on the basis of an image-pickup-element-position control signal for correcting motion blurring, control voltage applied to the first actuator units 408 by a driving circuit 425. An output signal from the image pickup element 420 is transmitted to the controlling circuit 424. The controlling circuit 424 monitors the signal from the position detecting circuit 422 and the signal from the image pickup element 420 to, on the basis of an image-pickup-element-position control signal for correcting blurring at one peripheral portion of a print, control voltage applied to the second actuator units 412 through the driving circuit 425. The image-pickup-element-position control signals correspond to information regarding a target position of the image pickup element for correcting motion blurring or blurring at one peripheral portion of a print.

FIGS. 27A to 27D show operations of the image-pickup-element driving unit according to the twelfth embodiment in a plane that is perpendicular to the optical axis of the image-pickup-element driving unit.

Figure 27A:
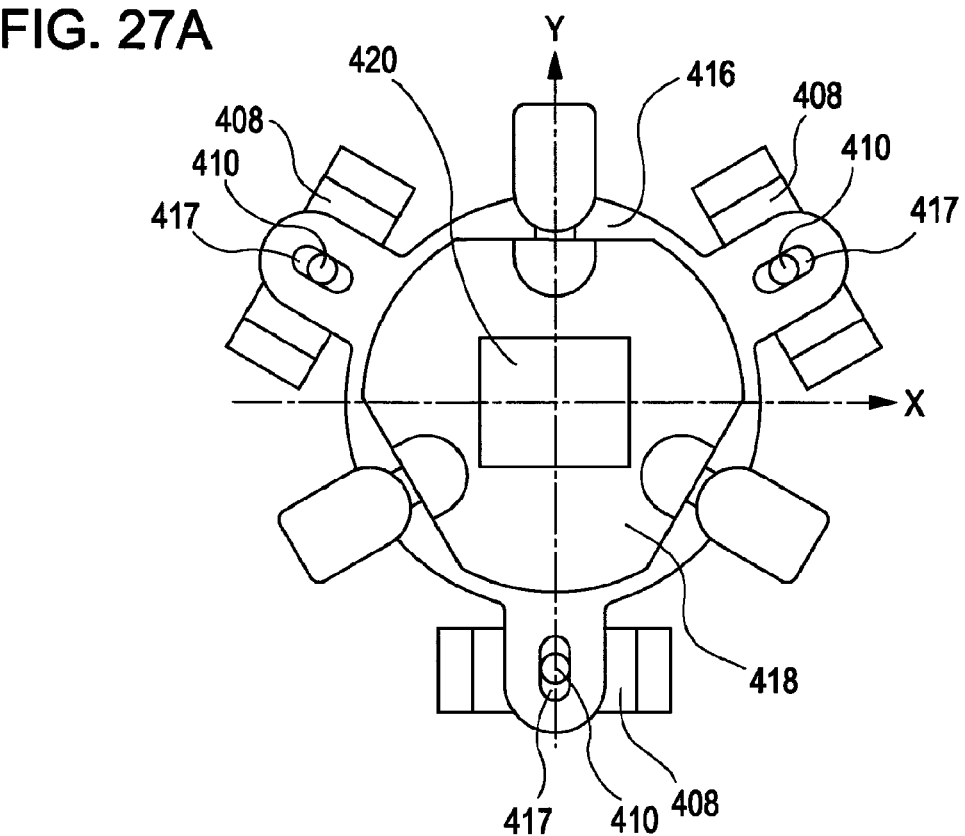
FIGS. 27A to 27D and FIGS. 28A and 28B show operating states of the driving unit according to the twelfth embodiment.

FIG. 27A shows a state in which an image pickup plane of the image pickup element is positioned so that the optical axis is at the center. With the optical axis being defined as a Z axis, an X axis and a Y axis that are perpendicular to each other are defined as in FIG. 27A.

When, in the state shown in FIG. 27A, voltage is applied to the three first actuator units 408, the actuator elements are stretched and contracted, so that the holding members 409 move in a direction of an actuator driving axis. Since this causes the pins 410 to move in the driving axis direction along with the holding members 409, the base member 416 having the slotted holes 417 engaging the pins 410 moves so as to follow the movement of the pins 410 and the holding members 409. Since the image pickup element 420 is held by the base member 416 through the second actuator units 412 as well as by the image-pickup-element holding member 418, the image pickup element 420 moves along with the base member 416.

Figure 27B:
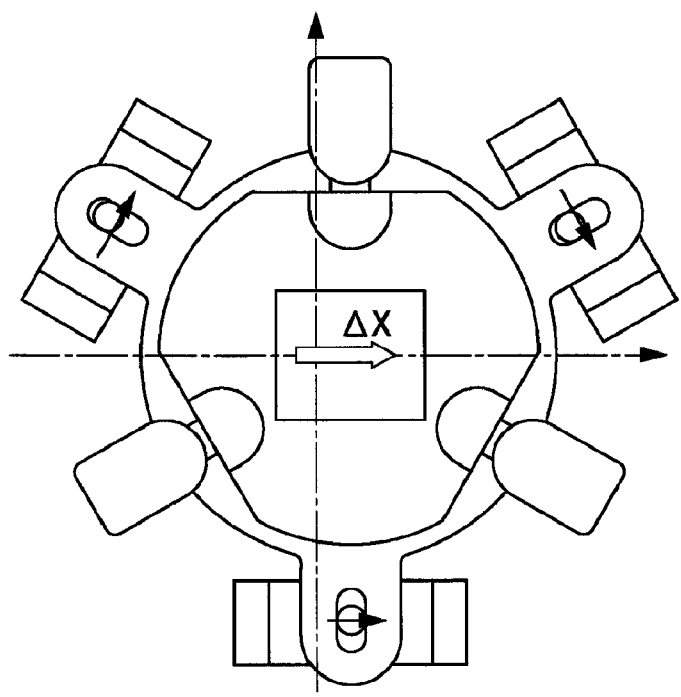
Figure 27C:
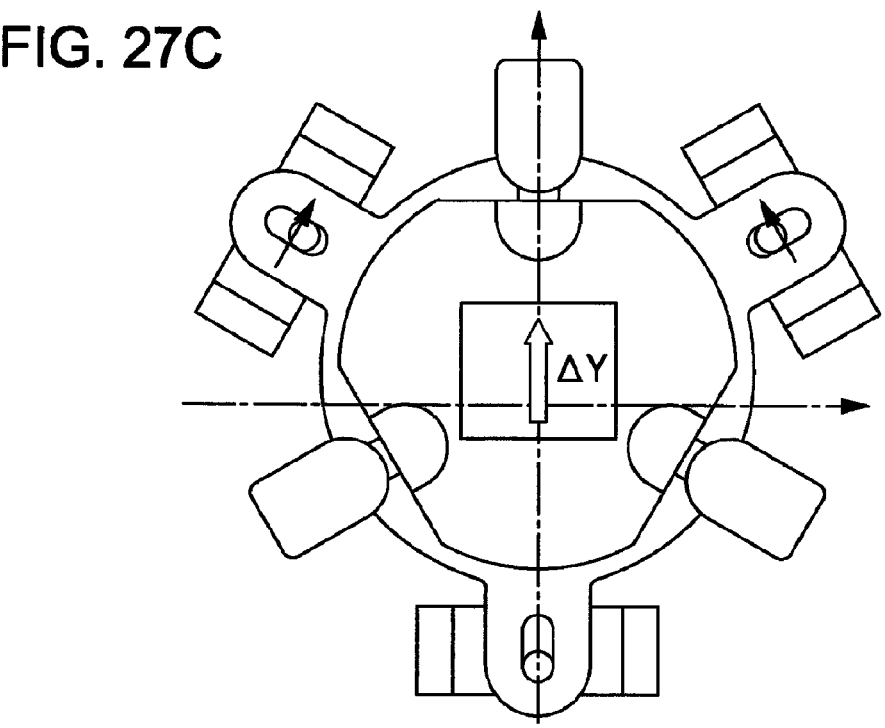
Figure 27D:
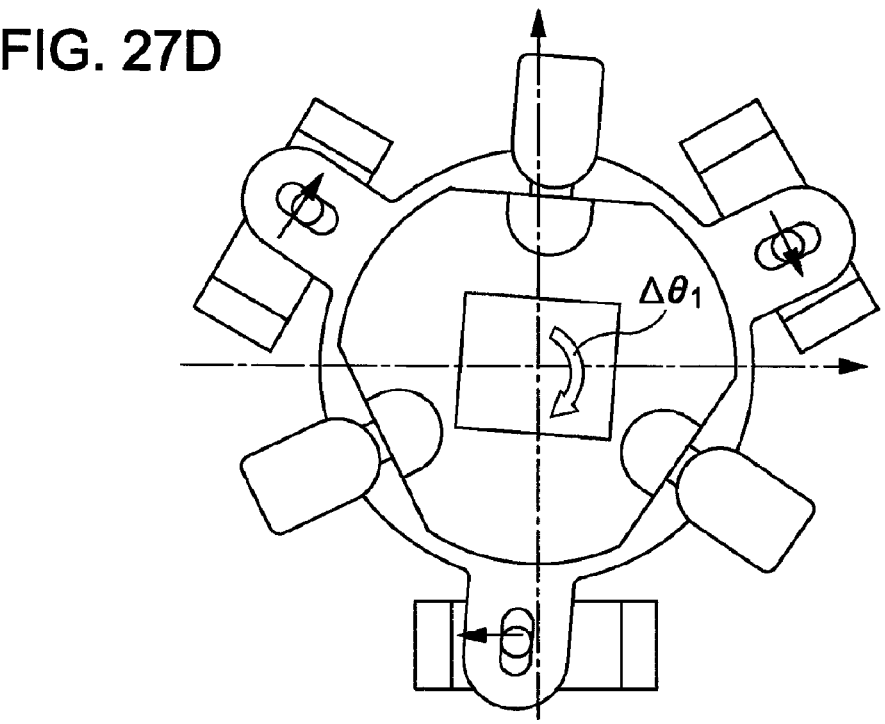

When voltage is applied to the first actuator units 408 from the state shown in FIG. 27A, the state changes to states shown in FIGS. 27B to 27D. FIG. 27B shows the state in which the image pickup element has moved in the X direction by an amount $\Delta X$. FIG. 27C shows the state in which the image pickup element has moved in the Y direction by an amount $\Delta Y$. FIG. 27D shows the state in which the image pickup element has rotated by $\Delta \theta 1$ around the Z axis as a center.

In FIGS. 27A to 27D, the position of the base member 416 is determined as a result of engaging the three slotted holes 417 with the pins 410. By combining the movements of the base member 416 as shown in FIGS. 27B to 27D on the basis of the signals from the controlling circuit 424, such as those shown in FIG. 26, motion blurring is corrected.

Figure 28A:
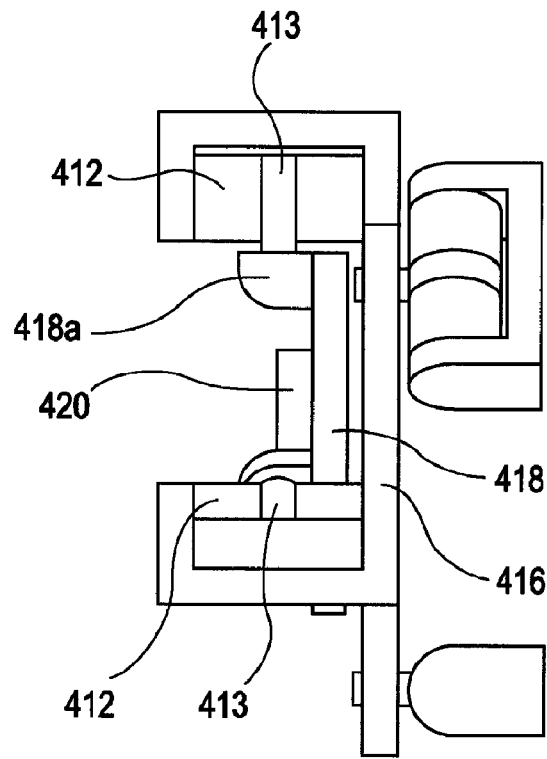
Figure 28B:
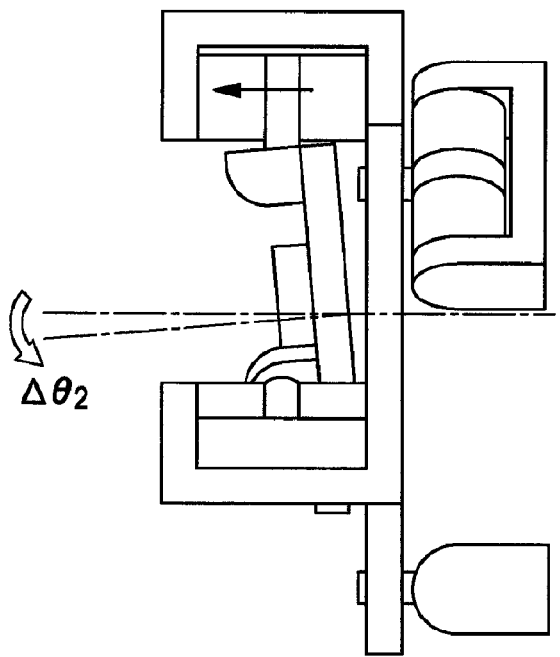

FIGS. 28A and 28B show operations of the image-pickup-element driving mechanism according to the embodiment in the optical axis direction.

FIG. 28A shows a state in which the image pickup plane of the image pickup element 420 is positioned so that it is perpendicular to the optical axis. When voltage is applied to the second actuator units 412, the actuator elements (films) are stretched and contracted, so that the holding members 413 move in the direction of the actuator driving axis. Since this causes the pins 414 to move in the axial direction along with the holding members 413, the image-pickup-element holding member 418 having the holes 419 engaging the balls 415 at the ends of the pins 414 moves so as to follow the movement of the pins 418 and the holding members 413.

Since the image pickup element 420 is held by the image-pickup-element holding member 418, the image pickup element 420 moves along with the image-pickup-element holding member 418.

When voltage is applied to the second actuator units 412 from the state shown in FIG. 28A, the state changes to that shown in FIG. 28B in which an axis that is orthogonal to the image pickup plane has been rotated by $\Delta \theta_2$ with respect to the optical axis. In FIGS. 28A and 28B, the position of the image-pickup-element holding member 418 is determined as a result of engaging the three holes 419 and the three balls 415. By moving the image-pickup-element holding member 418 as shown in FIG. 28B on the basis of the signals from the controlling circuit 424, such as those shown in FIG. 26, tilting of the image pickup element is performed, so that blurring at one peripheral portion of a print is corrected.

FIG. 29 is a flowchart of the steps of performing a shooting operation of a shooting device using the driving mechanism according to the embodiment.

In Step 501, a dust reduction operation start signal is input to the driving circuit, and voltage in accordance with the input signal is applied to the first actuator units 408 and the second actuator units 412, so that the base member 416 and the image-pickup-element holding member 418 vibrate. The vibration causes dust to fall off from the surface of the image pickup element 420. In Step 502, an image input signal to the image pickup element is processed to correct blurring at one peripheral portion of a print by the drive controlling operation that has been described with reference to FIG. 26. Then, in Step 503, the shooting device is set in a level state in a shooting state. Thereafter, in Step 504, motion blurring is controlled as a result of driving the actuator units 408. Then, the process proceeds to Step 505 in which a release switch (not shown) of the camera 421 is switched on to perform shooting, after which output from the image pickup element is stored in a storage device, such as a memory.

Although, in the above-described embodiment, the base member 416 is driven by the first actuator units 408 along the plane that is perpendicular to the optical axis, and the image-pickup-element holding member 418 is driven by the second actuator units 412 in the optical axis direction, it is possible to drive the image-pickup-element holding member by the actuator units along the plane that is perpendicular to the optical axis to correct blurring, and to drive the base member 416 by the actuator units in the optical axis direction to tilt drive the image pickup element. In addition, although, in the actuator connecting mechanisms, the balls engage the engaging holes and the pins engage the slotted holes, the balls may engage the slotted holes and the pins may engage the engaging holes as required.

Although, in the above-described embodiment, cylindrical electroactive polymer actuator elements are used, electroactive polymer actuator elements in the form of a bellows may also be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An optical device comprising:
a lens holding member that holds a blur correcting lens and that is movable in a direction along a plane that is orthogonal to an optical axis of the lens; and
an actuator that moves said lens holding member in the direction along the plane,
wherein said actuator includes holding member, and two actuator elements, formed of electroactive polymer, and a connecting member that connects the lens holding member, and
said connecting member is sandwiched between each end of said two actuator elements in the direction along the plane,
said connecting member adheres to each end of said two actuator elements,
each of the other ends of said two actuator elements adheres said holding member, and
said lens holding member moves in the direction along the plane by elastic deformation of said two actuator elements in the direction along the plane.

2. An optical device comprising:
a motion-blur detecting sensor that receives light from a shooting optical system;
a motion-blur detecting sensor holding member that holds motion-blur detecting sensor and that is movable in a direction along a plane that is orthogonal to an optical axis of the shooting optical system; and
an actuator that moves motion-blur detection sensor holding member in the direction along the plane,
wherein said holding member, and two actuator elements, formed of electroactive polymer, and a connecting member that connects the motion-blur detecting sensor holding member, and
said connecting member is sandwiched between each end of said actuator elements in the direction along the plane,
said connecting member adheres to each end of said actuator elements,
each of the other ends of said actuator elements adheres to said holding member, and
said actuator including holding member moves in the direction along the plane by elastic deformation of said actuator elements in the direction along the plane.

* * * * *